(12) United States Patent
Masters et al.

(10) Patent No.: US 8,622,657 B2
(45) Date of Patent: *Jan. 7, 2014

(54) UNDERWATER DEVICE FOR ROV INSTALLABLE TOOLS

(71) Applicants: Rodney H. Masters, Houston, TX (US); Billy L. Griffith, Houston, TX (US)

(72) Inventors: Rodney H. Masters, Houston, TX (US); Billy L. Griffith, Houston, TX (US)

(73) Assignee: VIV Suppression, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,020

(22) Filed: Oct. 23, 2012

(65) Prior Publication Data

US 2013/0064607 A1    Mar. 14, 2013

Related U.S. Application Data

(63) Continuation of application No. 12/272,433, filed on Nov. 17, 2008, now Pat. No. 8,297,883, which is a continuation-in-part of application No. 12/098,744, filed on Apr. 7, 2008, now abandoned.

(51) Int. Cl.
*B63C 11/52* (2006.01)

(52) U.S. Cl.
USPC .......................................... 405/190; 166/338

(58) Field of Classification Search
USPC ........ 405/154.1, 184.1, 184.2, 190, 211, 216; 166/65.1, 66.4, 66.7, 208, 335, 338
See application file for complete search history.

(56) References Cited

U.S. PATENT DOCUMENTS

| | | | |
|---|---|---|---|
| 3,163,221 A * | 12/1964 | Shatto, Jr. | 166/368 |
| 3,508,410 A * | 4/1970 | Lynch | 405/190 |
| 3,851,491 A | 12/1974 | Mason | |
| 4,116,015 A | 9/1978 | Duncan | |
| 4,602,893 A | 7/1986 | Gist et al. | |
| 4,674,915 A | 6/1987 | Shatto, Jr. | |
| 4,721,055 A | 1/1988 | Pado | |
| 4,746,246 A | 5/1988 | Cowan et al. | |
| 4,832,530 A | 5/1989 | Andersen et al. | |
| 4,880,335 A | 11/1989 | Lee | |
| 5,039,254 A | 8/1991 | Piercy | |
| 5,593,249 A | 1/1997 | Cox et al. | |
| 5,738,034 A | 4/1998 | Wolff et al. | |
| 5,984,584 A | 11/1999 | McMillan et al. | |
| 6,010,278 A | 1/2000 | Denison et al. | |
| 6,067,922 A | 5/2000 | Denison et al. | |
| 6,223,672 B1 | 5/2001 | Allen et al. | |
| 6,401,646 B1 | 6/2002 | Masters et al. | |
| 6,561,734 B1 | 5/2003 | Allen et al. | |
| 6,571,878 B2 | 6/2003 | McDaniel et al. | |
| 6,588,985 B1 | 7/2003 | Bernard | |

(Continued)

OTHER PUBLICATIONS

Bowman, Jonathan, et al., Developments in Riser Vortex Induced Vibration Analysis, Advances in Riser Technologies, Jun. 1998, pp. 1-5.

*Primary Examiner* — Frederick L Lagman
(74) *Attorney, Agent, or Firm* — Edmonds & Nolte, P.C.

(57) ABSTRACT

Methods and apparatus for installing underwater devices on sub-sea structures. The apparatus can include a body having at least one pair of support members extending therefrom. At least one actuator, adapted to move in a linear direction, can be disposed on each support member. At least one connector can be disposed on each actuator. The connector can include at least one aperture disposed therethrough for receiving an attachment member.

24 Claims, 14 Drawing Sheets

(56) References Cited

U.S. PATENT DOCUMENTS

| | | |
|---|---|---|
| 6,685,394 B1 | 2/2004 | Allen et al. |
| 6,695,539 B2 | 2/2004 | McMillan et al. |
| 6,702,026 B2 | 3/2004 | Allen et al. |
| 6,928,709 B2 | 8/2005 | McMillan et al. |
| 6,994,492 B2 | 2/2006 | McMillan et al. |
| 7,017,666 B1 | 3/2006 | Allen et al. |
| 7,070,361 B2 | 7/2006 | McMillan et al. |
| 7,316,525 B2 | 1/2008 | Allen et al. |
| 7,337,742 B1 | 3/2008 | Masters et al. |
| 7,578,038 B2 | 8/2009 | McMillan et al. |
| 8,297,883 B2 * | 10/2012 | Masters et al. ............ 405/190 |
| 2005/0141967 A1 | 6/2005 | Giles et al. |
| 2006/0011348 A1 | 1/2006 | Fenton et al. |
| 2006/0226668 A1 | 10/2006 | Smith et al. |
| 2007/0140797 A1 | 6/2007 | Armstrong |
| 2007/0296229 A1 | 12/2007 | Chauvin et al. |
| 2008/0035351 A1 | 2/2008 | Masters et al. |
| 2008/0050181 A1 | 2/2008 | Masters et al. |

* cited by examiner

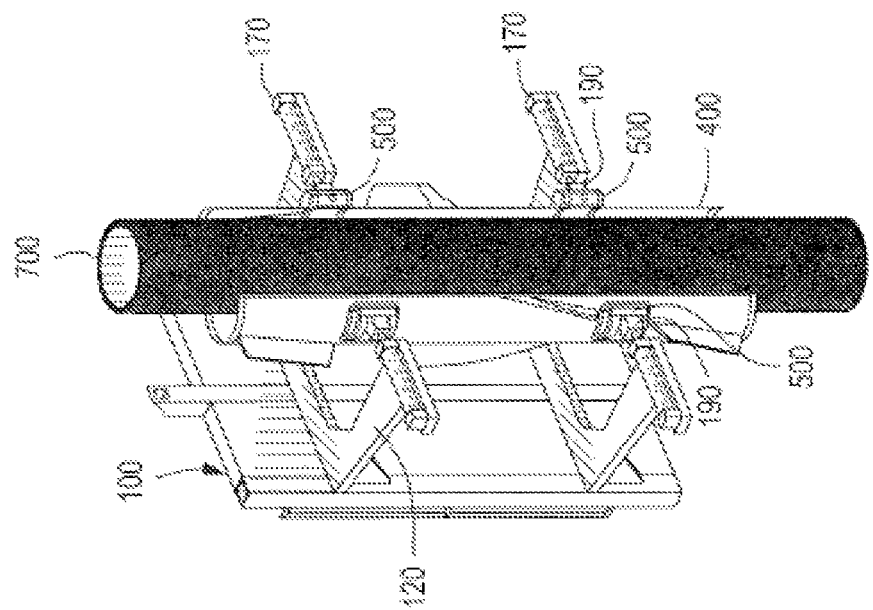
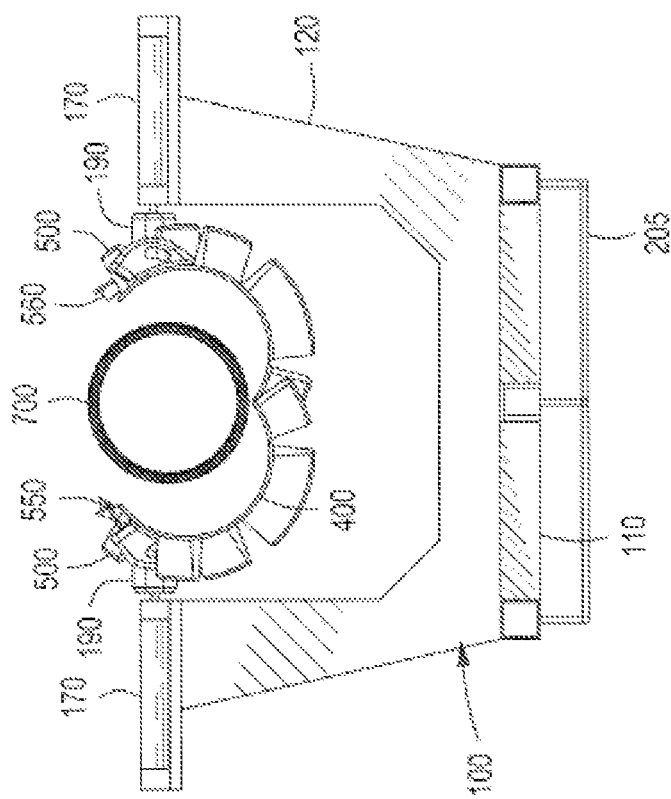

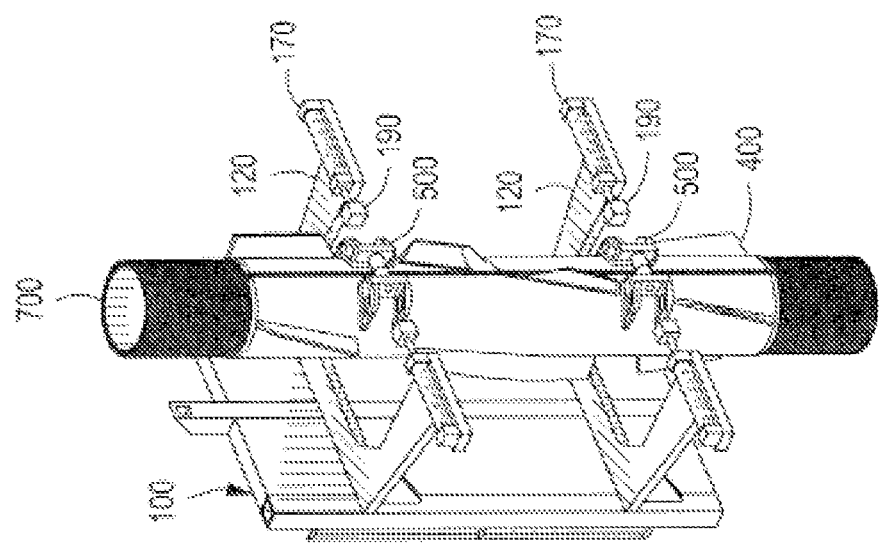
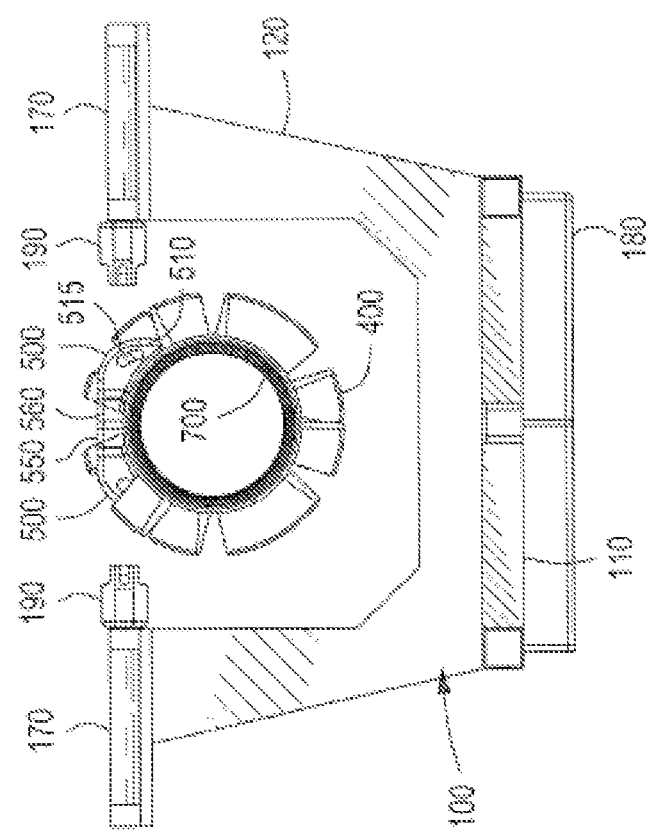
FIG. 11
FIG. 12

UNDERWATER DEVICE FOR ROV INSTALLABLE TOOLS

CROSS-REFERENCE TO RELATED APPLICATIONS

This application is a continuation of U.S. Pat. No. 8,297,883, filed on Nov. 17, 2008, which is a continuation-in-part (CIP) of U.S. Patent Application having Ser. No. 12/098,744 (now abandoned), filed on Apr. 7, 2008, each of which is hereby incorporated by reference in its entirety.

BACKGROUND

1. Field of the Invention

Embodiments of the present invention generally relate to apparatus and methods for remotely installing underwater tools on sub sea structures.

2. Description of the Related Art

Numerous challenges are encountered in offshore operations, such as oil and gas exploration, production, and transportation. One such challenge is minimizing or eliminating the vibration of sub-surface equipment and structures caused by currents and tidal action. Typical marine structures susceptible to damage by currents and tidal action include subsea pipelines, drilling and production lines, import and export risers, tendons for tension leg platforms, and other elongated, sub-surface, components and structures used in offshore operations.

The flow of water around a rigid body, such as subsurface equipment and/or structures creates a vortex on the reverse or downstream side of the rigid body. The vortexes depart or shed from the downstream side of the rigid body at a frequency that is proportionate to the velocity of the fluid flowing past the rigid body. Over a given body shape, higher velocity flows will create a higher rate of vortex shedding than lower velocity flows over the same body. The vortices created by the flow are shed on alternate sides of the rigid body (e.g. the first vortex will shed 90° clockwise from the direction of flow, the second 90° counter-clockwise from the direction of flow). The process of vortex shedding on alternate sides of the body places alternating, 180° opposed, forces (i.e. a vibration) on the subsurface equipment and/or structures. The frequency of the vibration will vary with the velocity of the water flowing past the subsurface equipment and/or structures.

This current induced vibration in marine elements is often referred to as "vortex-induced vibration," or "VIV." When the frequency of shedding the vortices is near the natural frequency of the marine element, harmonic resonance can result in potentially destructive levels of vibration.

Sub-surface shrouds, fairings, and/or strakes are commonly used on equipment and structures to prevent or minimize vortex-induced vibration. Ordinarily, strakes or other VIV-reduction devices are installed on the surface prior to deployment of subsurface equipment and/or structures. For existing structures, VIV-reduction devices are frequently deployed using divers for shallow water installations or using remotely operated vehicles ("ROVs") for deep water installations.

ROVs are usually the preferred way to install devices subsea, especially in deeper waters. In deeper waters, human divers are exposed to potentially dangerous working conditions, which are not a factor with a machine. A ROV is an underwater robot that is usually controlled from the surface by an operator. Typical ROVs are equipped with hydraulic manipulators, a vision system, and a remote control system to allow the operator to maneuver the ROV to a desired location under water to perform its intended task.

U.S. Pat. Nos. 6,994,492; 6,695,539; 6,928,709; and 7,316,525 each disclose hinged or clam shell underwater devices that are manipulated by a ROV for installing a clam shell, VIV-reduction device underwater. Such hinged or "clam shell" underwater device requires a manipulator or clamp having mating ends that rotate bi-directionally upon a pivot point within a single plane. The mating ends of the clamp engage opposite ends of the clam shell, VIV-reduction device in an open position and then rotate or pivot bi-directionally within a single plane to a closed position thereby closing the VIV-reduction device about a subsea structure to be protected from VIV. Such clam shell design in the deployment tool is inherently complex, requiring tight tolerances on the tooling during manufacturing and assembly. Operationally, adequate space must be provided for the tool's pivoting arms to swing during opening and closing. Also, the force exerted by the clam shell tool design when closing is greatly reduced as there is a tong moment arm disadvantage between the operating mechanism and where the clam shell tool closes the VIV device. The existing clam shell designs are also bulky and difficult for an ROV to handle, and in some cases the clam shell tool must be supported by a topside vessel when in operation.

There is a need, therefore, for improved systems and methods for deploying underwater devices about sub-sea structures.

SUMMARY

Apparatus and methods for installing underwater devices on sub-sea structures are provided. In at least one specific embodiment, the apparatus can include a body having at least one pair of support members extending therefrom, at least one actuator disposed on each support member, and at least one connector disposed on each actuator. The actuator can be adapted to move in a linear direction. The connector can include at least one aperture disposed therethrough for receiving an attachment member.

In at least one other specific embodiment, the apparatus for installing an underwater device on sub-sea structures can include a body having a first pair of support members extending from a first end thereof and a second pair of support members extending from a second end thereof. The body can include at least two spaced apart structural members having a buoyant material disposed therebetween. At least one actuator can be disposed on each support member. The actuator can be adapted to move in a linear direction. At least one connector can be disposed on each actuator. The connector can include at least two spaced apart protrusions extending therefrom. The spaced apart protrusions can include at least one aperture disposed therethrough for receiving an attachment member. The apertures can be linearly aligned. The connector can include an attachment device for attaching to the actuator.

In at least one specific embodiment, the method for installing underwater devices on sub-sea structures can include attaching an underwater device to a deployment tool. The deployment tool can include a body having at least one pair of support members extending therefrom, at least one actuator disposed on each support member, and at least one connector disposed on each actuator. The actuator can be adapted to move in a linear direction. In one or more embodiments, the connector can include at least one aperture disposed therethrough for receiving an attachment member.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 depicts a plan view of the deployment tool depicted in FIG. 1 holding the strake depicted in FIG. 4 proximate to a sub-sea structure, according to one or more embodiments described.

FIG. 8 depicts an isometric view of the deployment tool, the underwater device, and the sub-sea structure depicted in FIG. 7, according to one or more embodiments described.

FIG. 11 depicts a plan view of the deployment tool depicted in FIG. 1 after attaching the strake depicted in FIG. 4 to the sub-sea structure depicted in FIG. 7, according to one or more embodiments described.

FIG. 12 depicts an isometric view of the deployment tool, the underwater device, and the sub-sea structure depicted in FIG. 11, according to one or more embodiments described.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
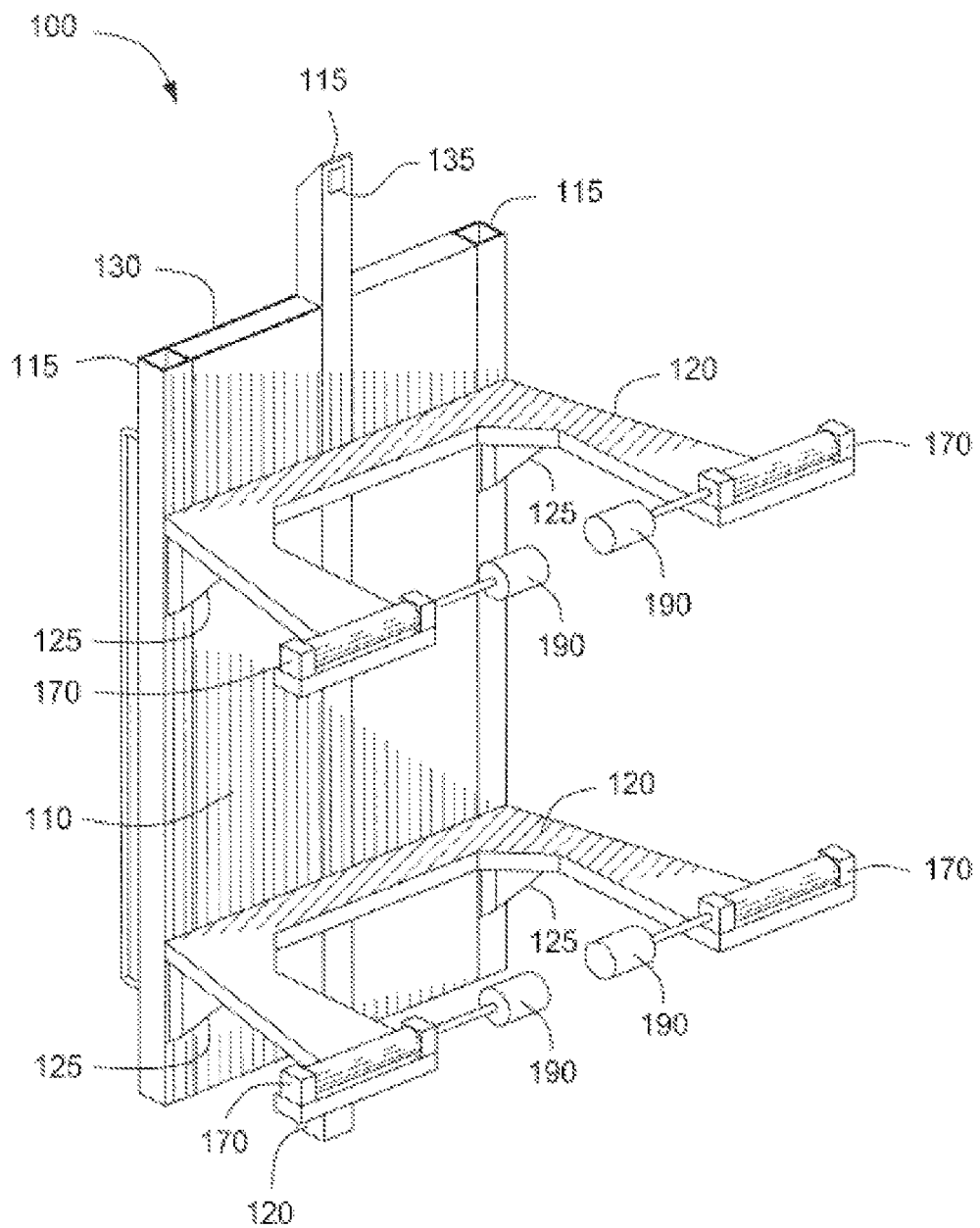
FIG. 1 depicts an isometric view of an illustrative deployment tool for remotely installing an underwater device underwater, according to one or more embodiments described.
Figure 2:
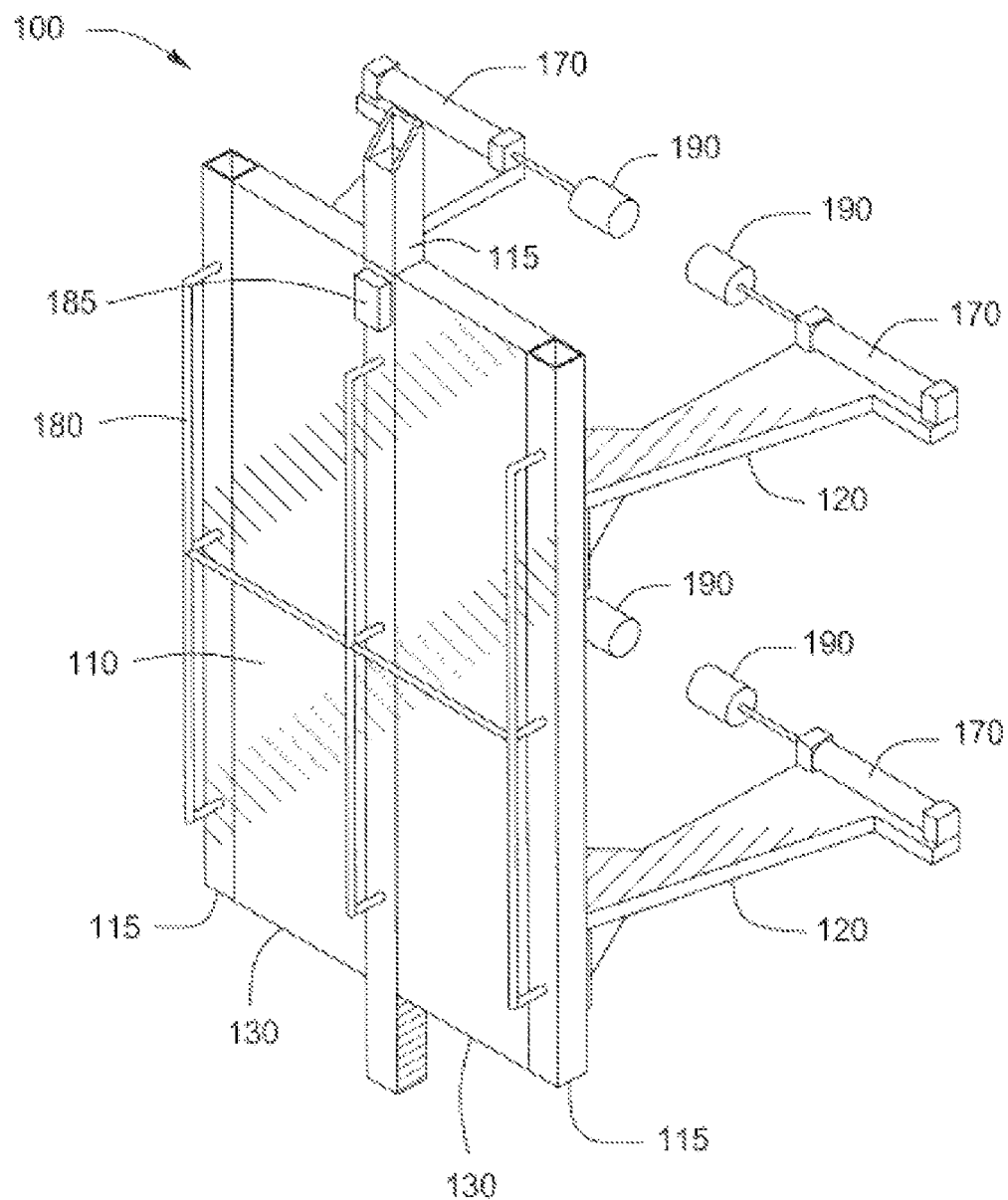
FIG. 2 depicts a reverse isometric view of the deployment tool depicted in FIG. 1.

FIGS. 1 and 2 depict isometric views of an illustrative deployment tool 100 for remotely installing an underwater device, according to one or more embodiments. As depicted in FIGS. 1 and 2, the deployment tool 100 can include a body 110, support members 120 (four are shown), actuators 170 (four are shown), and connectors 190 (four are shown). The deployment tool 100 is not a clam-shell device, meaning the deployment tool 100 has no hinged or pivotable components or parts. Instead, the actuators 170 disposed on the body 110 operate or move in a linear, single coordinate axis.

The body 110 can include one or more structural support beams or members 115 to provide a frame or housing. The structural support members 115 can be arranged in parallel as depicted and any number of cross-beams or support members can be used to add additional strength or support.

Each structural support member 115 can be hollow or solid, depending on the strength and stiffness design requirements. In one or more embodiments, each structural support member 115 can include one or more fins, flutes, ribs, or other similar devices disposed in, on, or thereabout to improve rigidity, strength, and/or stiffness. The structural support members 115 can be constructed of a metallic, non-metallic, or composite material. In one or more embodiments, the structural support members 115 can be made of one or more non-metallic materials including, but not limited to, engineered plastic, fiberglass, fiber reinforced plastic (FRP), carbon fiber, or any combination thereof. In one or more embodiments, the structural support members 115 can be made of metallic materials including, but not limited to, ferrous alloys, non-ferrous alloys, or any combination thereof.

One or more panels 130 can be disposed between any two support members 115. Each panel 130 can be negatively, neutrally, or positively buoyant. In one or more embodiments, the one or more panels 130 can be made of a positively buoyant material to provide a neutrally buoyant deployment tool 100. In one or more embodiments, each panel 130 can include one or more internal chambers (not shown) to contain a fluid capable of changing the buoyancy of the body 110. For example, the buoyancy of a given panel 130 can be adjusted by injecting or releasing a fluid such as a gas or liquid into the one or more internal chambers (not shown).

Each support member 120 can extend laterally from the body 110. The support members ("laterals" or "arms") 120 are preferably normal to the longitudinal centerline of the body 110, but can vary from about 10° to about 90° from the horizontal. Each support member 120 can be permanently or detachably attached to the first side of the body 110. In one or more embodiments, the support members 120 can be permanently attached to the first side of the body 110 by welding, riveting or any combination thereof. In one or more embodiments, the support members 120 can be detachably attached to the first side of the body 110 by screwing, pinning, bolting, or any combination thereof. In one or more embodiments, the support members 120 can be integral with the body 110.

Each support member 120 can be constructed of one or more metallic, non-metallic, or composite materials. In one or more embodiments, the support members 120 can be made of a metallic material including, but not limited to, ferrous alloys, non-ferrous alloys, or any combination thereof. In one or more embodiments, the support members 120 can be made of a non-metallic material including, but not limited to, engineered plastic, fiberglass, fiber reinforced plastic (FRP), carbon fiber, or any combination thereof. In one or more embodiments, one or more fins, flutes, ribs, or other similar devices can be disposed on, in, or about the support members 120 to improve the rigidity, strength, and/or stiffness of the support members 120. In one or more embodiments, a corrosion resistant coating suitable for use in fresh and/or salt water environments can partially or completely encapsulate the support members 120.

One or more gussets 125 can be used to support, strengthen, and/or brace the support members 120. In one or more embodiments, the gussets 125 can be permanently attached to the first side of the body 110 and to the support members 120 by welding, riveting or any combination thereof. In one or more embodiments, the gussets 125 can be detachably attached to the first side of the body 110 and to the support members 120 by screwing, pinning, bolting, or any combination thereof. In one or more embodiments, the gussets 125 can be integral with the first side of the body 110 or support members 120.

The one or more actuators 170 can be disposed on or about each of the support members 120. The actuators 170 can be capable of linear translation and/or displacement through a predetermined range of motion. The actuators 170 can include, but are not limited to one or more electric motors, one or more electro-magnetic actuators (e.g. solenoids), one or more pneumatic actuators, one or more hydraulic actuators, one or more mechanical actuators or any combination thereof. In one or more embodiments, the actuators 170 can include, but are not limited to one or more hydraulic cylinders filled with a fluid to achieve a linear displacement. In one or more embodiments, the actuators 170 can incorporate one or more internal springs or similar passive energy storage devices which can permit the actuator to return to a predetermined "fail-safe" position upon loss or removal of hydraulic pressure.

At least one connector 190 can be disposed on each actuator 170. The connector 190 can permit the connection of one or more underwater tools or devices (not shown) to the deployment tool 100. In one or more embodiments, the connector 190 can be a resilient or deformable material to engage a complimentary and/or mating receptacle disposed about the one or more underwater devices. For example, the connector 190 can be a resilient or deformable material adapted to snap-fit or friction fit into one or more complimentary and/or mating receptacles disposed about the one or more underwater devices.

Figure 3:
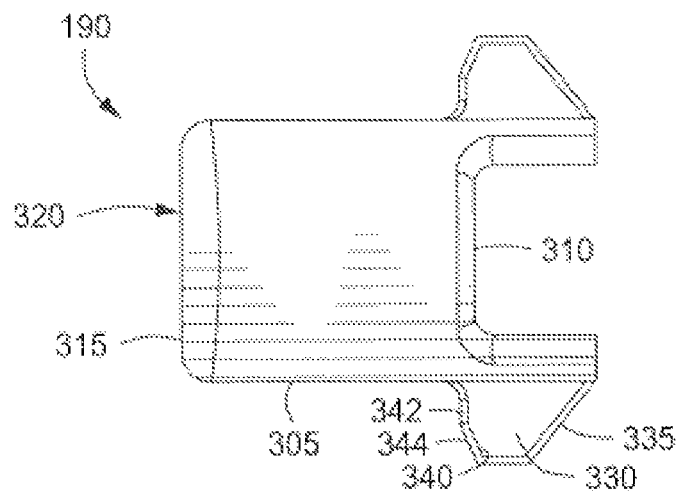
FIG. 3 depicts an elevation view of an illustrative connector according to one or more embodiments described.

FIG. 3 depicts an elevation view of an illustrative connector 190 according to one or more embodiments. The connector 190 can include a single or multi-piece body 305 having a first end 310 and a second end 315. The first end 310 of the body 305 can include one or more protrusions 330 extending therefrom (two protrusions 330 are depicted in FIG. 3). In one or more embodiments, the second end 315 of the body can provide one or more attachment devices 320, such as one or more holes, adapted to accommodate the actuator 170. In one or more embodiments, the attachment device 320 can be a threaded hole to accommodate a complimentary attachment device on the actuator 170. In one or more embodiments, the attachment device 320 connecting the connector 190 to the actuator 170 can include, but is not limited to threads, adhesives, pins, friction fit, or any combination thereof. In one or more embodiments, the connector 190 can be integrally cast with the actuator 170, for example as an integral casting with a piston disposed within the actuator 170.

The one or more protrusions 330 can extend radially outward from the first end 310 of the body 305. In one or more embodiments, the protrusions 330 can extend from the first end 310 of the body 305 parallel to the longitudinal axis of the body 305. A first profiled surface 335 and a second profiled surface 340 of the one or more protrusions 330 can have similar or different tapered or angled profiles. The first profiled surface 335 of the one or more protrusions 330 can maintain a constant or variable angle profile with respect to the longitudinal centerline of the body 305. In one or more embodiments, the first profiled surface 335 can be at a constant angle, measured with respect to the longitudinal centerline of the body 305, of from about 10° to about 90°.

The second profiled surface 340 of the one or more protrusions 330 can maintain a constant or variable slope with respect to the longitudinal centerline of the body 305. In one or more embodiments, the second profiled surface 340 can be equally or unequally divided into a first portion 342 and a second portion 344. In one or more embodiments the first 342 and second 344 portions can be sloped at the same or different angles measured with respect to the longitudinal centerline of the body 305. In one or more embodiments, the first portion 342 can be sloped at an angle of from about 10° to about 90°. In one or more embodiments, the second portion 344 can be sloped at an angle of from about 10° to about 90°. In one or more specific embodiments, the first portion 342 can be sloped at an angle of from about 75° to about 90° and the second portion sloped at an angle of from about 30° to about 75°. In one or more embodiments, the one or more protrusions 330 can be capable of resisting a minimum applied shear force of about 3.6 kN, about 4.4 kN, about 5.3 kN, or about 6.2 kN, or more without deformation or severance from the body 305.

The one or more connectors 190 can be made of one or more metallic, non-metallic, or composite materials. In one or more embodiments, the one or more connectors 190 can be made of a metallic material including, but not limited to, ferrous alloys, non-ferrous alloys, or any combination thereof. In one or more embodiments, the one or more connectors 190 can be made of a non-metallic material including, but not limited to, engineered plastic, fiberglass, fiber reinforced plastic (FRP), carbon fiber, or any combination thereof.

Referring again to FIGS. 1 and 2, the body 110 can further include one or more handles 180 disposed thereon. The one or more handles 180 can provide a point of attachment and can permit movement of the deployment tool 100 using one or more carriers, such as a diver and/or a remotely operated vehicle ("ROV"). In one or more embodiments, the one or more handles 180 can be attached to or otherwise disposed on the one or more structural support members 115 of the body 110. In one or more embodiments, the one or more handles 180 can be permanently attached to the body 110 by welding, riveting or any combination thereof. In one or more embodiments, the one or more handles 180 can be detachably attached to the body 110 by screwing, pinning, bolting, or any combination thereof. In one or more embodiments, the handle 180 can be integral with the body 110.

The body 110 can also include one or more handles 180 and one or more hydraulic interfaces 185 disposed thereon. The one or more hydraulic interfaces 185 can permit manual and/or ROV manipulation or cycling of the one or more actuators 170. In one or more embodiments, the hydraulic interface 185 can be a no leak, hot-stab type connector permitting leak-free or near leak-free connection of an external hydraulic supply, pump, and/or system to the deployment tool 100. In one or more embodiments, the hydraulic interface 185 can permit the use of a hydraulic system external to the deployment tool 100, for example an ROV-based hydraulic system. One or more hydraulic lines can be routed from the hydraulic interface 185 to the one or more actuators 170 disposed on each of the support members 120 to provide fluid communication thereto.

The deployment tool 100 can be used to deploy one or more underwater devices or tools including, but not limited to, one or more underwater vortex induced vibration reduction devices, underwater inspection devices, underwater leak detection devices, underwater leak repair devices, underwater pipeline repair devices, underwater maintenance devices, underwater test devices, underwater diagnostic devices, underwater monitoring devices, underwater measurement devices, or any combination thereof. In one or more embodiments, the one or more vortex induced vibration devices can include strakes, shrouds, fairings and similar devices intended to minimize and/or prevent vortex induced vibration. Representative strakes, shrouds, and fairings are disclosed in U.S. Pat. Nos. 6,561,734; 6,702,026; 6,685,394; 7,017,666; 7,070,361; 6,571,878; 5,984,584; 6,067,922; 6,223,672; 6,010,278; 6,401,646; and US 2008/0050181. For clarity and ease of description, the deployment tool 100 will be further described with reference to a strake 400 as depicted in FIGS. 4 and/or 18.

Figure 4:
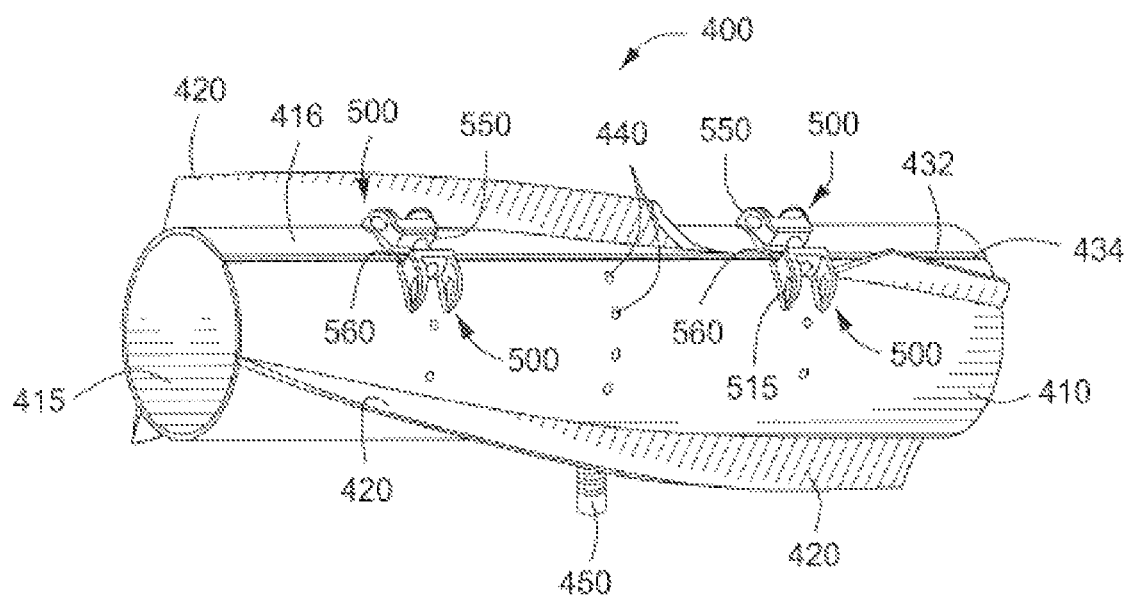
FIG. 4 depicts an isometric view of an illustrative strake for suppressing vortex induced vibration caused by fluid flow across a structure according to one or more embodiments described.

FIG. 4 depicts an isometric view of an illustrative strake 400 for suppressing vortex induced vibration, according to one or more embodiments. In one or more embodiments, the strake 400 can include a housing 410, one or more fins 420, one or more alignment stubs 450, and one or more pairs of connector lugs 500. The housing 410 can have a split-body or hinged-body configuration. In the split-body configuration, the housing 410 can have two or more discrete pieces which can be joined, fastened or otherwise attached together thereby permitting installation of the strake 400 about an elongated sub-sea structure (not shown). In the hinged-body configuration, the housing 410 can have a longitudinal split allowing the body to pivotably open and close thereby permitting installation of the strake 400 about an elongated sub-sea structure (not shown). The illustrative strake 400 depicted in FIG. 4 is a hinged-body configuration. In one or more embodiments, all or a portion of the strake 400 can be constructed of a flexible material, such as a polyolefin including polyethylenes like linear low density polyethylene (LLDPE), for example. The density of such materials can advantageously assist in making the strake 400 neutrally buoyant.

In one or more embodiments, the housing 410 can be cylindrically shaped, having an inner and an outer diameter. In one or more embodiments, the inner diameter can accommodate an elongated sub-sea structure, for example a riser, a tendon, or a pipeline. In one or more embodiments, the longitudinal axes of the housing 410 and the sub-sea structure can be coaxially aligned. In a hinged-body configuration, the housing 410 can extend from a first locking edge 432 to a second locking edge 434. When in a closed position, the first locking edge 432 of the housing 410 can abut the second locking edge 434 of the housing 410, thereby permitting the attachment of the housing 410 to a sub-sea structure.

The use of a flexible material for the housing 410 can enable the housing 410 to flexibly open, and close about, the sub-sea structure upon which the housing 410 is disposed. In one or more specific embodiments, the housing 410 can be a unitarily formed cylindrical structure. One or more fins 420 can be formed or helically attached about the circumference of the outer surface 416 forming the housing 410. The number of fins 420 most effective for reducing eddy formation can be determined, at least in part, by the outer diameter of the housing 410. In one or more embodiments, the fins 420 can extend over the entire length of the housing 410 or any section/portion thereof. The number of fins 420 disposed on the housing 410 can range from 1 to 200, or from 1 to 150, or from 1 to 100, or from 5 to 60. The one or more fins 420 can be helically arranged or disposed in any pattern about the body 305. The fins 420 can have a projection from the surface 416 of the body 410 from about 0.05D to about 0.5D. The fins 420 can have a height ranging from a low of about 0.05D, about 0.1D, or about 0.15D to a high of about 0.2D, 0.25D, or 0.3D or more. As used herein "D" refers to the inner diameter 415 of the housing 410.

Each fin 420 can be integrally formed with the housing 410 or each fin 420 can be a separate component that is affixed, attached, or otherwise disposed on the outer surface of the housing 410. For example, the fins 420 can and the housing 410 can be integrally formed by injection molding, insert molding, or rotomolding techniques. If two or more materials are desired, 2K or 3K injection or insert molding techniques can be used. The fins 420 can be attached to the housing 410 using any suitable method, including, but not limited to, epoxy or other adhesives, thermal fusion or bonding, fasteners, rivets, screws, nuts and bolts, welding, or any combination thereof. In one or more embodiments, the housing 410 can have one or more fins 420 that are integrally formed therewith and one or more fins 420 that are affixed, attached, or otherwise disposed thereon.

In one or more embodiments, one or more alignment stubs 450 can project outwardly from the exterior surface of the housing 410. In one or more embodiments, the alignment stubs 450 can serve as engagement members for a ROV (not shown). In one or more embodiments, the alignment stub 450 and the housing 410 can be integrally formed such that the alignment stub 450 is an extension of the housing 410. The physical shape and projection of the alignment stub 450 can be determined based upon the physical characteristics of the carrier, ROV, or deployment tool 100 used to deploy the strake 400. In one or more embodiments, the top surface of the alignment stub 450 can be rounded or tapered to aid in the engagement of alignment stub 450 by the ROV or deployment tool. In one or more embodiments, the alignment stub 450 can be centrally located on the housing 450. Locating the alignment stub 450 at a central point both longitudinally and laterally on the housing 410 can permit even distribution of the weight of the strake 400 on the ROV and/or deployment tool 100, increasing the stability of the ROV and/or deployment tool 100 while holding the strake 400.

In one or more embodiments, the housing 410 can include one or more holes 440 disposed therethrough. In one or more embodiments, the one or more holes 440 can provide a flow path for fluid between the inner diameter of the housing 410 and outside of the housing 410. In one or more embodiments, the one or more holes 440 can accommodate an annulus spacer (discussed and described below with reference to FIG. 19) disposed therethrough.

Figure 5:
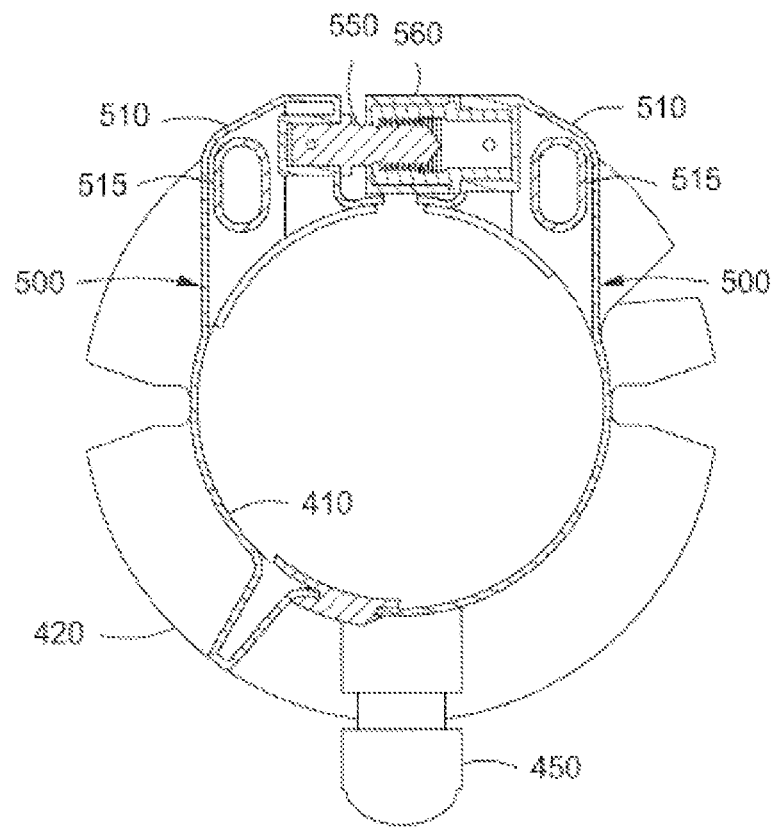
FIG. 5 depicts a partial cross-sectional view of the strake depicted in FIG. 4.
Figure 6:
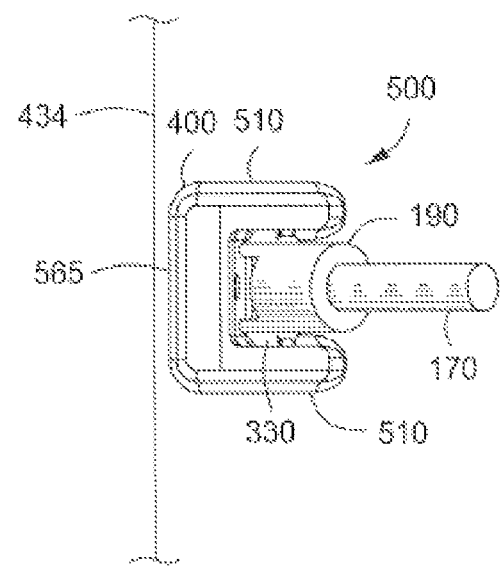
FIG. 6 depicts an elevation view of the connector depicted in FIG. 3 inserted into an illustrative connector lug, according to one or more embodiments described.

FIG. 5 depicts a partial cross sectional view of an illustrative strake 400 as depicted in FIG. 4, according to one or more embodiments. In one or more embodiments, the two or more connector lugs 500 can be disposed on opposite sides of the longitudinal split on the exterior of the housing 410. In one or more embodiments, opposing pairs of complimentary connector lugs 500 can be disposed proximate the first 432 and the second 434 locking edges of the housing 410. In one or more embodiments, the one or more connector lugs 500 can include two side walls 510 extending perpendicularly from a housing 565 disposed parallel to the first 432 and second 434 locking edges. In one or more embodiments, the side walls 510 can be parallel and spaced apart from each other as depicted in FIGS. 4-6. In one or more embodiments, one or more slots or apertures 515 can be disposed in either or both side walls 510 to permit the detachable attachment of the one or more connector lugs 500 to one or more connectors 190.

In one or more embodiments, each of the opposing connector lugs 500 can include one male (projecting) connector 550 disposed perpendicular to the first locking edge 432 and one female (receiving) 560 connector disposed perpendicular to the second locking edge 434. In one or more embodiments, the male connector 550 and female connector 560 can be as described in US 2008/0050181.

As depicted in FIG. 5, the male connector 550 can be inserted into the opposing female connector 560. Inserting the male connector 550 into the opposing female connector 560 can hold the first locking edge 432 and the second locking edge 434 together, thereby locking the strake 400 in a closed position. In one or more embodiments, inserting the male connector 550 into the opposing female connector 560 can provide a separation-resistant connection between the male 550 and female 560 connectors. Although two male connector assemblies 550 and two female connector assemblies 560 are depicted on the strake 400 as depicted in FIG. 4, any number of similarly opposing male 550 and female 560 connector assemblies can be disposed on the strake 400. In one or more embodiments, the one or more male connectors 550 can be withdrawn or otherwise removed from the one or more female connectors 560, thereby permitting subsequent detachment of the strake 400 from a sub-sea structure. The separation of the one or more male connectors 550 from the one or more female connectors 560 can permit the removal of the strake 400 from the sub-sea structure without causing damage to either the strake 400 or the sub-sea structure. In one or more embodiments, the force required to separate the male connector 550 from the female connector 560 can be about 3.6 kN or more, about 4.4 kN or more, about 5.3 kN or more, or about 6.2 kN or more.

FIG. 6 depicts an elevation view of the illustrative connector 190 inserted into an illustrative connector lug 500, according to one or more embodiments. For clarity, the male connector 550 and the female connector 560 are omitted from FIG. 6. The insertion of the one or more connectors 190 into the one or more connector lugs 500 disposed on or about the strake 400 can detachably attach the strake 400 to the deployment tool 100. In one or more embodiments, the attachment of the strake 400 to the deployment tool 100 can be performed by surface and/or ship-borne personnel and/or automated machines.

In one or more embodiments, the protrusions 330 on the connector 190 can be press-fitted into slots or apertures 515 (see FIG. 5) in the parallel arms 510 of the connector lug 500. The sloped first profiled surface 335 (see FIG. 3) of the protrusions 330 can assist in spreading the parallel arms 510 of the connector lug 500 a sufficient distance to permit the insertion of the protrusions 330 into the slots or apertures 515 in the parallel arms 510. After press-fitting the connectors 190 into the connecting lugs 500, the actuators 170 can be retracted to open the strake 400. The first portion 342 of the second sloped surface 340 (see FIG. 3) of the one or more protrusions can have a sufficiently steep slope to prevent the disengagement of the connector 190 from the slots or apertures 515 in the parallel arms 510 of the connector lugs 500 when the actuators 170 are retracted.

FIG. 7 depicts a plan view of the deployment tool 100 depicted in FIG. 1 holding an open strake 400 proximate to an illustrative sub-sea structure 700, according to one or more embodiments. FIG. 8 depicts an isometric view of the deployment tool 100, strake 400, and sub-sea structure 700 depicted in FIG. 7, according to one or more embodiments. The strake 400 can be attached to the deployment tool 100 at the fabrication yard or on the vessel by ship-borne personnel. Referring to FIGS. 7 and 8, the strake 400 can be detachably attached to the deployment tool 100 by inserting the connectors 190 on the deployment tool 100 into the corresponding connector lugs 500 on the strake 400. In one or more embodiments, after attaching the connector lugs 500 to the connectors 190, the actuators 170 can be partially or completely retracted to open the strake 400. Opening the strake 400 can permit the placement of the strake 400 proximate the sub-sea structure 700 using the deployment tool 100 as depicted in FIGS. 7 and 8.

Figure 10:
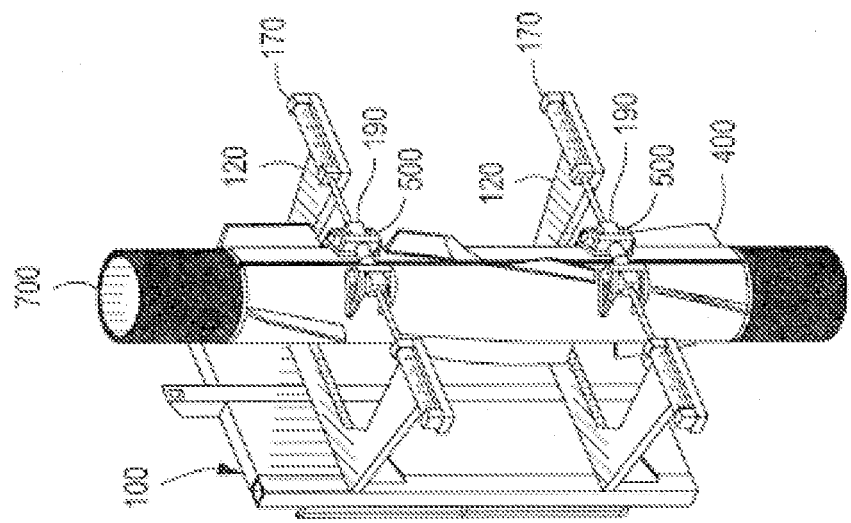
FIG. 10 depicts an isometric view of the deployment tool, the underwater device, and the sub-sea structure depicted in FIG. 9, according to one or more embodiments described.
Figure 9:
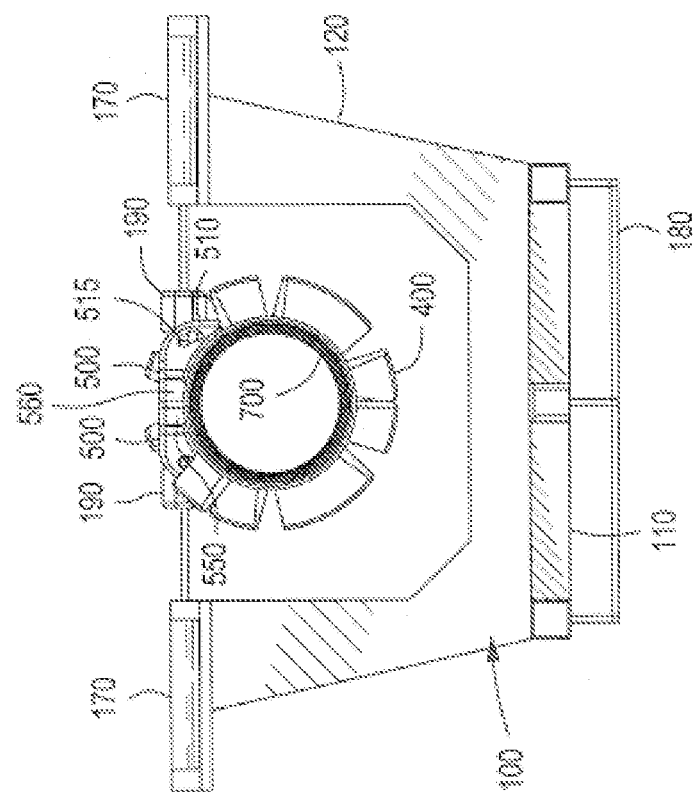
FIG. 9 depicts a plan view of the deployment tool depicted in FIG. 1 attaching the strake depicted in FIG. 4 to the sub-sea structure depicted in FIG. 7, according to one or more embodiments described.

FIG. 9 depicts a plan view of the deployment tool 100 depicted in FIG. 1 attaching the strake 400 depicted in FIG. 4 to the sub-sea structure 700, according to one or more embodiments. FIG. 10 depicts an isometric view of the deployment tool 100, strake 400, and sub-sea structure 700 depicted in FIG. 9, according to one or more embodiments. Referring to FIGS. 9 and 10, after positioning the strake 400 proximate to the sub-sea structure 700, the one or more actuators 170 can be extended using the hydraulic interface 185. Extending the one or more actuators 170 can close the strake 400 thereby inserting the male connectors 550 into the opposing female connectors 560, attaching the strake 400 to the sub-sea structure 700.

FIG. 11 depicts a plan view of the deployment tool 100 depicted in FIG. 1 after attaching the strake 400 depicted in FIG. 4 to the sub-sea structure 700, according to one or more embodiments. FIG. 12 depicts an isometric view of the deployment tool 100, the strake 400, and the sub-sea structure 700 depicted in FIG. 11, according to one or more embodiments. Referring to FIGS. 11 and 12, the one or more actuators 170 on the deployment tool 100 can be partially or completely retracted using the hydraulic interface 185 after inserting the male connectors 550 into the opposing female connectors 560 and attaching the strake 400 to the sub-sea structure 700. Retracting the actuators 170 can cause the connectors 190 to withdraw from the connector lugs 500 thereby detaching the strake 400 from the deployment tool 100.

In one or more embodiments, the second portion 344 of the second profiled surface 340 of the protrusion 330 can assist in the separation of the one or more connectors 190 from the one or more lugs 400 (see FIG. 3). As the actuator 170 is retracted, the second profiled surface 340 can contact the parallel arms 510 of the connector lug 500, causing the aims 510 to ride up the first portion 342 of the profiled surface 340 of the one or more protrusions 330. When the parallel aims 510 reach the less steeply sloped second portion 344 of the second profiled surface, 340 of the protrusion 330, the connector 190 can detach from the one or more connector lugs 500. In one or more embodiments, the force required to separate the one or more connectors 190 from the one or more connector lugs 500 can be about 0.9 kN or less; about 1.8 kN or less; or about 2.7 kN or less.

Figure 13:
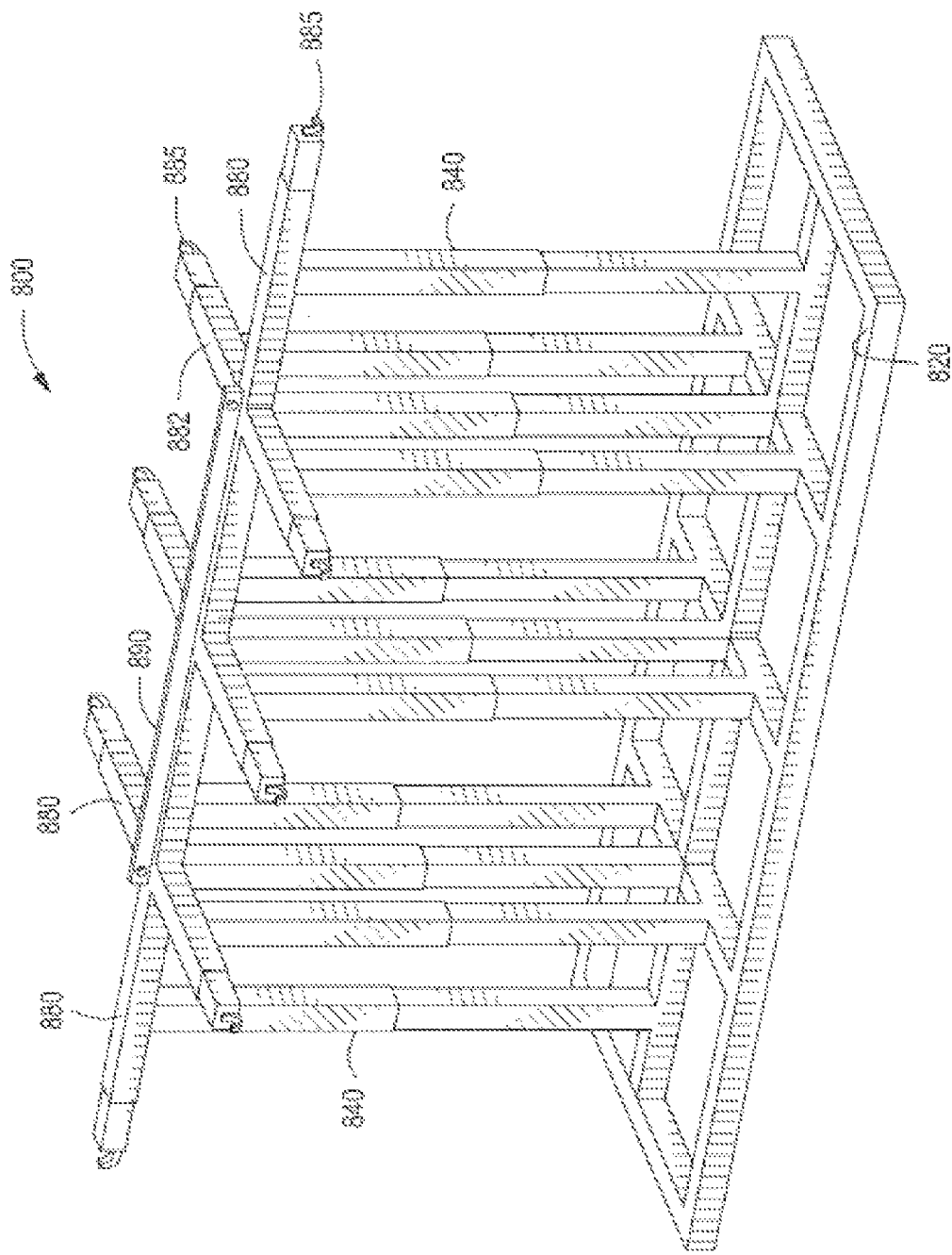
FIG. 13 depicts an isometric view of an illustrative platform for storing or holding a deployment tool, according to one or more embodiments described.

FIG. 13 depicts an isometric view of an illustrative platform 800 for storing or holding a deployment tool 100, according to one or more embodiments. The platform or rack 800 can include a first ("lower") frame 820 and a second ("upper") frame 880. The frames 820, 880 can be connected to one another via two or more support members 840. Any number of support members 840 can be used, depending on the weight to be supported by the platform 800. Each support member 840 can be extendable in a first direction to vary the distance between the frames 820, 880. This allows the platform 800 to accommodate varying heights or lengths of the deployment tool 100.

The second frame 880 can include one or more hanger arms 882 disposed thereon. Each hanger arm 882 can be extendable and retractable. Each hanger arm 882 can also include one or more attachment devices 885 for holding or otherwise engaging the deployment tool 100. Each attachment device 885 can include one or more rods, hooks, or similar devices complimentary to one or more attachment devices 135 disposed on each deployment tool 100 (see FIG. 1). For example, the equipment attachment device 885 can be a hook, and the complimentary attachment device 135 on each deployment tool 100 can be an aperture into which the hook can be securely inserted.

The second frame support 880 can also include one or more lifting lugs 890 disposed thereon. The lifting lug 890 can be connected to a crane, winch or similar equipment to permit the positioning of the platform 800. In one or more embodiments, the lifting lug 890 can be integral with, or attached to the second frame support 880 via welding, screwing, pinning or any other permanent or temporary means of attachment. In one or more embodiments, the lifting lug 890 can include a member having a plurality of holes for the insertion of the one or more cables, chains or similar devices connecting the platform 800 to a crane, winch or similar equipment.

The one or more support members 840 can be disposed in any order, arrangement and/or frequency about the first frame 820 and the second frame 880. The one or more support members 840 can project from the first frame 820 at the same angle or at different angles measured with respect to an upper surface of the first frame 820. The one or more support members 840 can project from the second frame 880 at the same angle different angles measured with respect to a lower surface of the second frame 880. Preferably, the support members 840 project normally, i.e. at 90°, measured with respect to the upper surface of the first frame 820 and lower surface of the second frame 880. In one or more embodiments, the support members 840 can be extendable, permitting adjustment of the length of the support members 840 between the first frame 820 and the second frame 880. Each support member 840 can be temporarily joined or affixed at a desired length using one or more connectors (not shown) including, but not limited to, bolts, screws, pins or any combination thereof.

The first ("lower") frame 820, second ("upper") frame 880, and support members 840 can be made from a metallic, non-metallic or composite material, including but not limited to, ferrous alloys, non-ferrous alloys, aluminum, engineered plastics, fiberglass, carbon fiber, fiber reinforced plastic (FRP), or any combination thereof. In one or more embodiments, one or more ribs or channels or other structural strengtheners can be incorporated in, on, or about the first frame 820, the second frame 880, and the support members 840. In one or more embodiments, one or more corrosion resistant coatings can partially or completely encapsulate the first frame 820, the second frame 880, and the support members 840.

Figure 14:
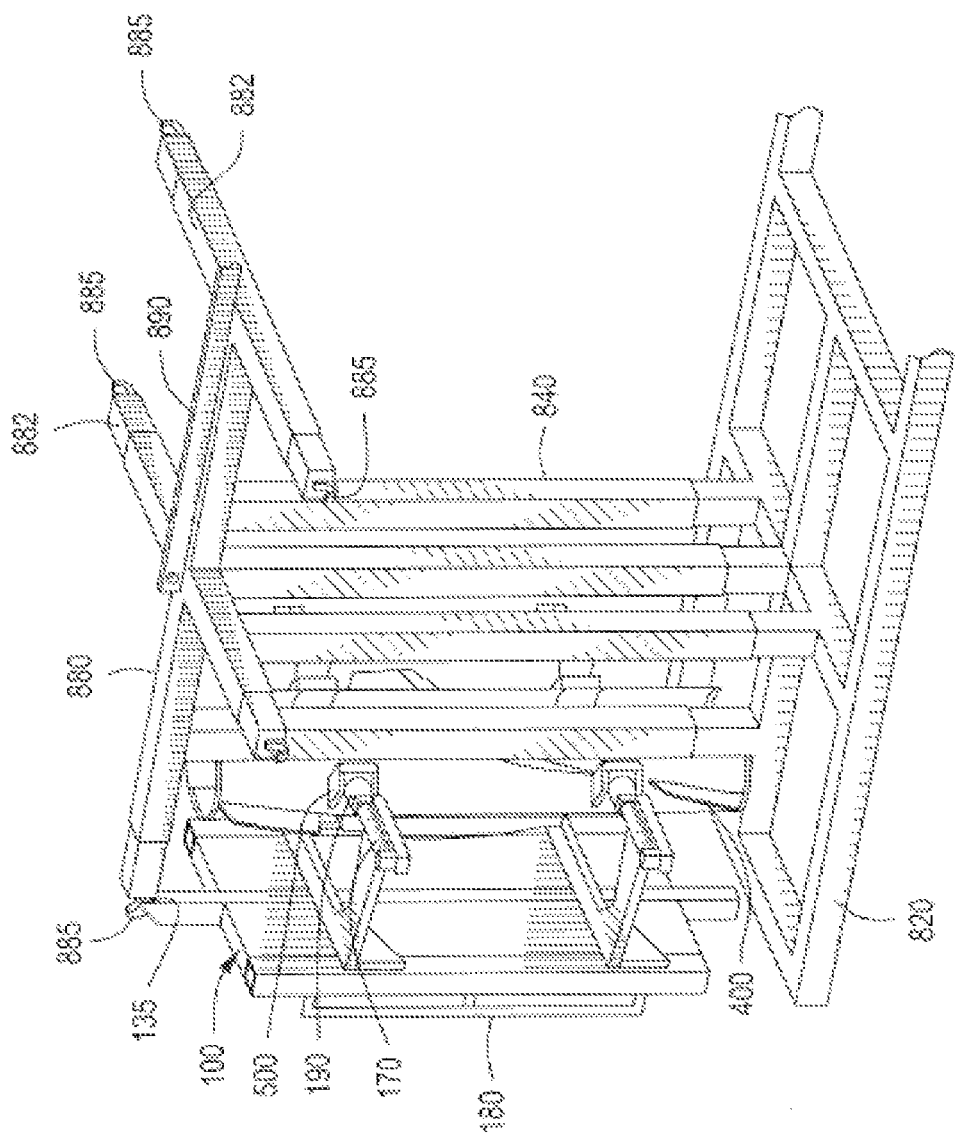
FIG. 14 depicts an isometric view of the platform depicted in FIG. 13 having a deployment tool disposed thereon, according to one or more embodiments described.

FIG. 14 depicts an isometric view of the platform 800 depicted in FIG. 13 having a deployment tool 100 disposed thereon, according to one or more embodiments. As depicted, the deployment tool 100 can be hung or otherwise attached to the platform 800 via the attachment device 885 disposed on the one or more hanger arms 882. Although not shown in FIG. 14, two or more platforms 800 can be connected, either end-to-end or side-to-side, to provide additional capacity for additional deployment tools 100.

In operation, a surface or ship-borne crew can attach one or more underwater devices, i.e. the strakes 400, to one or more deployment tools 100. The deployment tools 100, each having one or more strakes 400 attached thereto can be attached to one or more platforms 800. In one or more embodiments, all or a portion of the deployment tools 100 can be attached to a platform 800 with the actuators 170 retracted and strake 400 in the open position or with the actuators 170 extended and the strake 400 in the closed position. In one or more embodiments, a crane or winch can be attached to the lifting lugs 890 of the platform 800. The crane or winch can position the platform 800 containing the one or more deployment tools 100 proximate the sub-sea structure 700, for example one or more tendons, risers, pipes, or platform legs.

After deploying the platform 800 proximate the sub-sea structure, the one or more deployment tools 100 can be removed from the platform 800 using a carrier to engage the one or more handles 180 and the hydraulic interface 185. As used herein, the term "carrier" can include, but is not limited to one or more divers, one or more remotely operated vehicles, manually operated submersible, robot, robot operated submersible, or any combination thereof. The carrier can maneuver the deployment tool 100 and strake 400 to a location proximate the sub-sea structure 700. After positioning the strake 400 on the sub-sea structure 700, the carrier can extend the one or more actuators 170. Extending the one or more actuators 170 can close the strake 400, to engage the male connector 550 with the opposing female connector 560.

After attaching the strake 400 to the sub-sea structure 700, the carrier can retract the one or more actuators 170. Retracting the one or more actuators 170 can disengage the connector 190 from the lug 500. The empty deployment tool 100 can be returned to the platform 800 by the carrier. The installation procedure can be repeated until all or any number of strakes 400 is installed. The platform 800 can be brought to the surface via the crane or winch and re-used.

Figure 15:
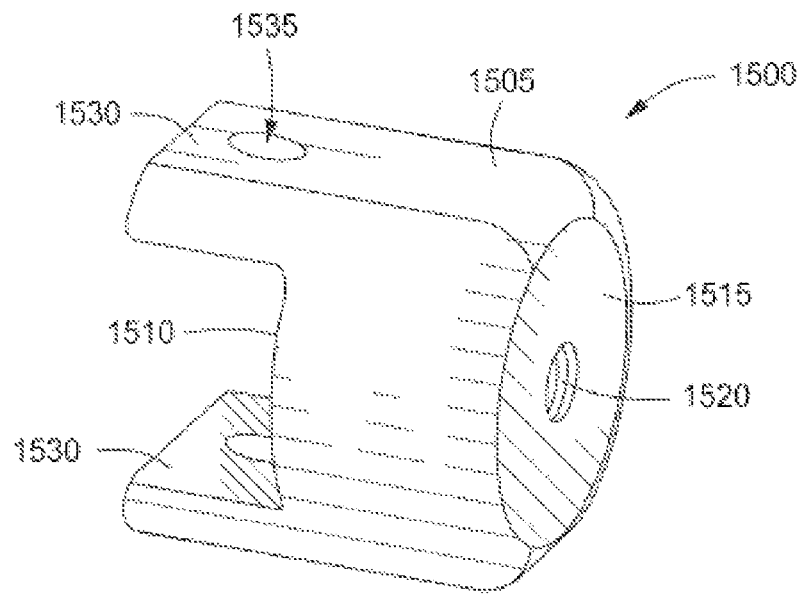
FIG. 15 depicts an isometric view of another illustrative connector according to one or more embodiments described.
Figure 16:
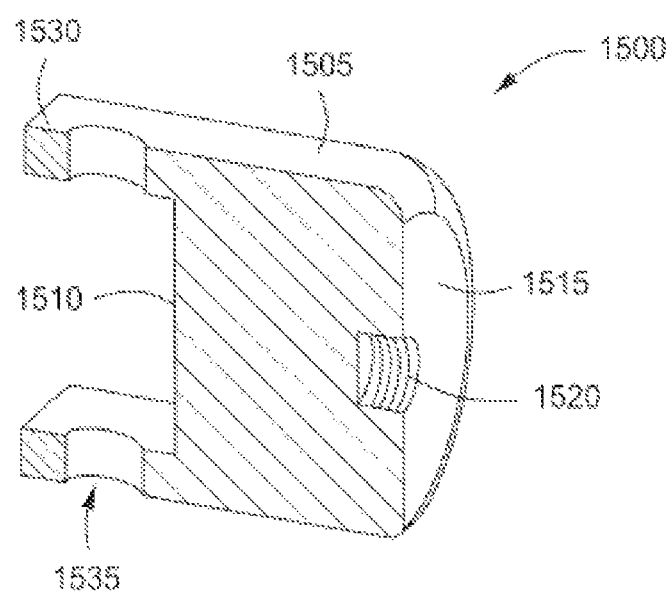
FIG. 16 depicts a cross-sectional view of the connector shown in FIG. 15, according to one or more embodiments described.

FIG. 15 depicts an isometric of an illustrative connector 1500 and FIG. 16 depicts a cross-sectional view of the connector 1500, according to one or more embodiments. Referring to FIGS. 15 and 16, the connector 1500 can include a single or multi-piece body 1505 having a first end 1510 and a second end 1515. The first end 1510 of the body 1505 can include one or more fingers or extensions 1530 (two are shown) extending therefrom. The one or more extensions 1530 can extend axially from the first end 1510, away from the body 1505. Preferably, the one or more extensions 1530 can extend linearly from the body 1505 parallel to a longitudinal axis of the body 1505.

The connector 1500 can be attached or otherwise connected to the actuator 170, shown and described above with reference to FIGS. 1 and 2. In one or more embodiments, the second end 1515 of the body 1505 can include one or more attachment devices 1520 formed thereon or therein. The attachment device 1520 can be adapted to engage or otherwise attach the connector 1500 to the actuator 170. In one or more embodiments, the attachment device 1520 can be a threaded hole, aperture, or recess to accommodate a complimentary attachment device on the actuator 170. In one or more embodiments, the connector 1500 can be integrally cast with the actuator 170, such as an integral casting with a piston disposed within the actuator 170.

In one or more embodiments, one or more holes or apertures 1535 can be disposed through one or more of the protrusions 1530. Preferably, one aperture 1535 is formed in each extension 1530. The apertures 1535 are preferably linearly aligned although they do not have to be. The holes or apertures 1535 formed through the extension(s) 1530 can receive one or more attachment members (described and shown below) that can secure the connector 1500 to one or more underwater tools or devices (described and shown above with reference to FIG. 4, for example).

In one or more embodiments, the connector 1500 can be made from any suitable material. In one or more embodiments, the connector 1500 can be made of a metal, a non-metal, or a combination thereof. Illustrative metallic materials can include, but are not limited to ferrous alloys, non-ferrous alloys, or any combination thereof. Illustrative non-metallic materials can include, but are not limited to engineered plastics, fiberglass, fiber reinforced plastics (FRP), carbon fibers, or any combination thereof. In one or more embodiments, the body 1505 and the one or more extensions 1530 can be made of an engineered plastic and a metallic eyelet, grommet, or metal ring can be disposed within the one or more apertures 1535 to strengthen and reinforce the one or more apertures 1535.

Although not shown, in at least one specific embodiment, the attachment device 1520 can be a hole or aperture that extends through the first end 1510 and the second end 1515 of the body 1505, which can receive the actuator 170. The actuator 170 can be secured with a pin, rivet, screw, bolt and nut, or any other securing device disposed about an end of the actuator 170. For example, a retaining device, such as a cotter pin can be disposed through the end of the actuator 170 between the two extensions 1530, thereby securing the connector 1500 to the actuator 170. In another example, the actuator 170 can include a tube or rod having a threaded inner diameter which could receive a bolt or screw, with the head of the bolt or screw secured against the first side 1510 of the connector 1500 and at least a portion of the threads of the bolt or screw secured within the threaded tube or rod of the actuator 170. In another example, the actuator 170 can include a rod having a threaded end, which can be disposed through the body 1505, and a nut or other threaded receiving device can be secured to the threaded end of the rod. A stop or position holder can be disposed about the actuator 170 to prevent the connector 1500 from moving along the actuator 170.

Figure 17:
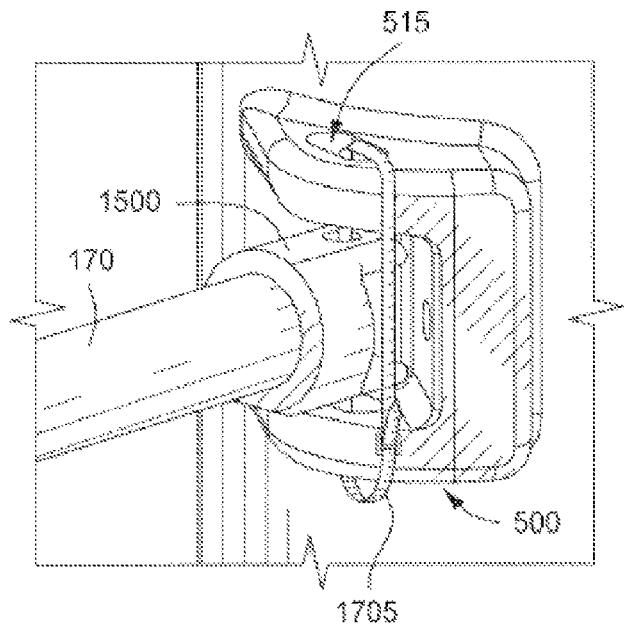
FIG. 17 depicts an isometric view of the connector depicted in FIG. 15 inserted into an illustrative connector lug of a VIV suppression device, according to one or more embodiments described.

FIG. 17 depicts an isometric view of the connector 1500 depicted in FIGS. 15 and 16 inserted into an illustrative connector lug 500, according to one or more embodiments. For clarity, the male connector lug 550 and the female connector 560 are omitted from FIG. 17. The one or more connector lugs 500 can be as discussed and described above with reference to FIGS. 4-6. The insertion of the one or more connectors 1500 into the one or more connector lugs 500 disposed on or about the strake 400 can detachably attach the strake 400 to the deployment tool 100. In one or more embodiments, the attachment of the strake 400 to the deployment tool 100 can be performed by surface and/or ship-borne personnel and/or automated machines.

In one or more embodiments, at least one of the one or more extensions 1530 on the connector 1500 can be inserted between the parallel arms 510 of the connector lug 500. Although not shown, in one or more embodiments, at least one or all of the one or more extensions 1530 can be disposed outside, i.e. not between the parallel arms 510 and secured thereto. The hole or aperture 1530 disposed through the one or more extensions 1530 can align with a hole or aperture 515 disposed on either or both side walls 510. In one or more embodiments, an attachment member 1705 can be disposed through the aligned holes 1530 and 510 to detachably attach the connector 1500 to the strake 400.

In one or more embodiments, the attachment member 1705 can include any suitable mechanism or device suitable for detachably attaching the connector 1500 to the underwater tool or device. For example, the attachment member 1705 can be a cable tie, wire, string, rope, pin, or any combination thereof. As shown in FIG. 17, the attachment member 1705 can be a cable tie. Illustrative cable ties can include, but are not limited to beaded cable ties, low profile cable ties, releasable cable ties, mounting hole cable ties, bent tip cable ties, light duty cable ties, medium duty cable ties, heavy duty cable ties, extra heavy duty cable ties, or any combination thereof. Another illustrative attachment member 1705 can be a length of wire, for example an aluminum wire, that can be passed through the aligned holes 510, 1530 and twisted, welded, or otherwise joined together. Another illustrative attachment member 1705 can be a length of string, twine, rope, cord, or other type of line which can be tied or otherwise joined together. In one or more embodiments, the attachment member 1705 can be a cotter pin.

In use, the attachment member 1705 can break or release when a predetermined force is exerted on the attachment member 1705. As discussed and described above with reference to FIGS. 11 and 12, the one or more actuators 170 on the deployment tool 100 can be partially or completely retracted using the hydraulic interface 185 after inserting the male connector 550 into the opposing female connector 560 and attaching the strake 400 to the sub-sea structure 700. For example, the one or more actuators 170 can linearly retract after closing the strake 400 about the undersea structure.

As discussed and described above with reference to FIG. 5, the force required to separate the male connector 550 from the female connector 560 can be about 3.6 kN or more, about 4.4 kN or more, about 5.3 kN or more, or about 6.2 kN or more. In one or more embodiments, the force required to break the attachment member 1705 or otherwise disconnect the attachment member 1705 can be less than the force required to separate the male connector 550 from the female connector 560. For example, the force required to break or otherwise disconnect the attachment member 1705 can be about 3 kN or less, about 2.5 kN or less, about 2 kN or less, about 1.5 kN or less, about 1 kN or less, about 0.8 kN or less, or about 0.5 kN or less. Therefore, retracting the one or more actuators 170 can detach the deployment tool 100 from the strake 400, which can leave the strake 400 disposed about the sub-sea structure.

Figure 18:
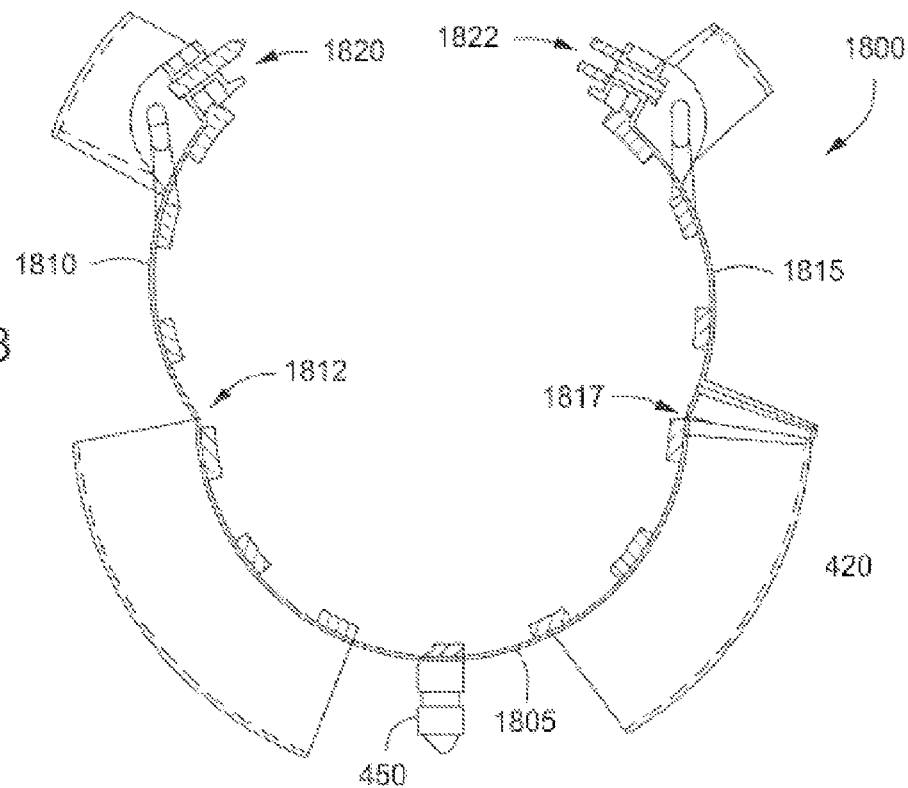
FIG. 18 depicts a cross-sectional view of an illustrative strake for suppressing vortex induced vibration, according to one or more embodiments described.

FIG. 18 depicts a cross-section view of an illustrative strake 1800 for suppressing vortex induced vibration caused by fluid flow across a structure, according to one or more embodiments. In one or more embodiments, the strake 1800 can include one or more fins 420, one or more alignment stubs 450, and one or more pairs of connector lugs 500, which can be similar as discussed and described above with reference to FIG. 4. In one or more embodiments, the strake 1800 can include a multi-segmented or multi-sectioned housing that includes three or more segments or sections (three are shown, a first section 1805, a second section 1810, and a third section 1815). The multi-sectioned housing can have a multi-hinged body configuration, for example a longitudinal hinge 1812 can be between the first section 1805 and the second section 1810 and a longitudinal hinge 1817 can be between the first section 1805 and the third section 1815. The first section 1805 can be joined, fastened, or otherwise attached to the second section 1810 and the third section 1815 thereby permitting installation of the strake 1800 about an elongated sub-sea structure (not shown).

In one or more embodiments, the second section 1810 can be rotatable in relation to the first section 1805 along the longitudinal hinge 1812. In one or more embodiments, the third section 1815 can be rotatable in relation to the first section 1805 along the longitudinal hinge 1817. The second section 1810 can have a first locking edge 1820 and the third section 1815 can have a second locking edge 1822. When in a closed position, the first locking edge 1820 of the second section 1810 can abut the second locking edge 1822 of the third section 1815, thereby permitting the attachment of the strake 1800 to a sub-sea structure. In one or more embodiments, the one or more pairs of connector lugs 500 can be disposed on opposite sides of the longitudinal split between the first section 1810 and the second section 1815. In one or more embodiments, opposing pairs of complimentary connector lugs 500 can be disposed proximate the first locking edge 1820 and the second locking edge 1822.

In one or more embodiments, a series of openings (not shown) can be disposed along the longitudinal hinge 1812 and/or the longitudinal hinge 1817. The openings can be slots, apertures, or other holes disposed through the strake 1800. The openings can improve the bending of the second section 1810 along the longitudinal hinge 1812 and/or the third section 1815 along the longitudinal hinge 1817 relative to the first section 1805. In one or more embodiments, the one or more fins 420 can terminate in the area proximate the longitudinal hinge 1812 between the first section 1805 and the second section 1810 and/or the area proximate the longitudinal hinge 1817 between the first section 1805 and the third section 1815.

In one or more embodiments, the second section 1810 and the third section 1815 can allow the deployment tool 100 (see FIGS. 1 and 2, for example) to remain engaged with the one or more alignment stubs 450 during installation of the strake 1800. Rotation of the second section 1810 and the third section 1815 along longitudinal hinges 1812 and 1817, respectively, can reduce the stress on the strake 1800. Therefore, the deployment tool 100 can remain engaged with the one or more alignment stubs 450, which can provide greater control during the installation of the strake 1800 about a sub-sea structure (not shown).

In one or more embodiments, the first section 1805, second section 1810, and/or third section 1815 can be independent sections that are not integrally connected. In such an embodiment the second section 1810 and/or the third section 1815 can be attached to the first section 1805 using mechanical hinges along the longitudinal hinges 1812 and/or 1817. In one or more embodiments, mechanical hinges can permit the second section 1810 and/or the third section 1815 to rotate about the longitudinal hinges 1812, 1817 relative to the first section 1805.

Figure 19:
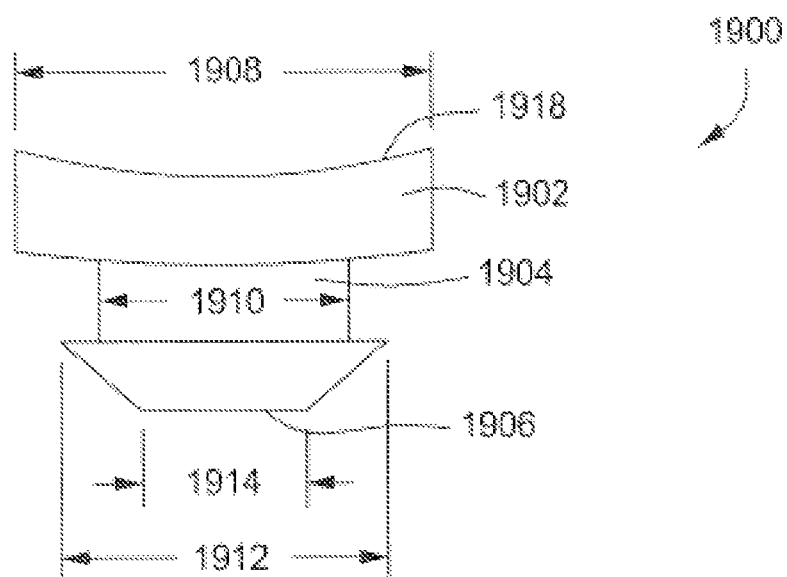
FIG. 19 depicts an elevation view of an illustrative annulus spacer according to one or more embodiments described.

FIG. 19 depicts an elevation of an illustrative annulus spacer 1900 according to one or more embodiments. In one or more embodiments, the annulus spacer 1900 can include an inner spacer member 1902, a spacer recess 1904, and a spacer retainer 1906. Inner spacer member 1902 can have a diameter 1908, which is larger than the diameter of the hole 440 disposed through the housing 410 (see FIG. 4), the hole disposed through the first section 1805, the hole disposed through the second section 1810, and/or the hole disposed through the third section 1815. The spacer recess 1904 can have a recess diameter 1910. In one or more embodiments, the recess diameter 1910 can be equal to or smaller than the diameter of hole 440. The spacer retainer 1906 can include a truncated cone having a retainer base diameter 1912 and a retainer head diameter 1914. The retainer head diameter 1914 can be less than the retainer base diameter 1912. The retainer head diameter 1914 can be less than the diameter of the hole 440, while retainer base diameter 1912 can be larger than the diameter of the hole 440. This configuration can provide a spacer retainer 1906 that can be installed by inserting the spacer retainer 1906 into hole 440.

Referring to FIGS. 4, 18, and 19, each spacer 1900 can be inserted through a hole 440 disposed through the housing 410, the first section 1805, the second section 1810, and/or the third section 1815 (not shown) from the inner surface. In one or more embodiments, the retainer head tip 1916 can be aligned with the hole 440, for example, and a force can be asserted against spacer surface 1918 until the spacer retainer 1906 passes through the hole 440 and the spacer retainer 1906 abuts the exterior surface of housing 410. Inner spacer member 1902 can be configured and sized such that the inner spacer member 1902 can be prevented from passing through the hole 440. In one or more embodiments, the spacer retainer 1906 can be sufficiently flexible, for example the spacer retainer 1906 can be elastically deformed, to pass through the hole 440.

In one or more embodiments, the annulus spacer 1900 can be sized such that the inner spacer member 1902 abuts the outer surface of a sub-sea structure (not shown) when the strake 400 and/or 1800 is installed about the sub-sea structure. In one or more embodiments, the spacer surface 1918 can be concave. In one or more embodiments, the spacer surface 1918 can be contoured to follow the contour of the surface of the sub-sea structure. This configuration can provide a suction effect between the spacer surface 1918 and the sub-sea structure about which the strake 400 and/or 1800 can be disposed. In one or more embodiments, the spacer surface 1918 can be convex, flat, or any other suitable configuration.

In one or more embodiments, the annulus spacer 1900 can be constructed of material suitable to induce frictional interaction between the strake 400 and/or 1800 and the sub-sea structure. Illustrative materials can include, but are not limited to 70-80 shore urethane. When strake 400 and/or 1800 is installed on a sub-sea structure the annulus spacers 1900 can reduce relative rotational and axial movement of the strake in relation to the sub-sea structure by hoop stress and frictional resistance to movement. Furthermore the annulus spacers 1900 can maintain a gap between the strake 400 and/or 1800 and the sub-sea structure to provide a fluid flow path between the strake 400 and/or 1800 and the sub-sea structure.

Figure 20:
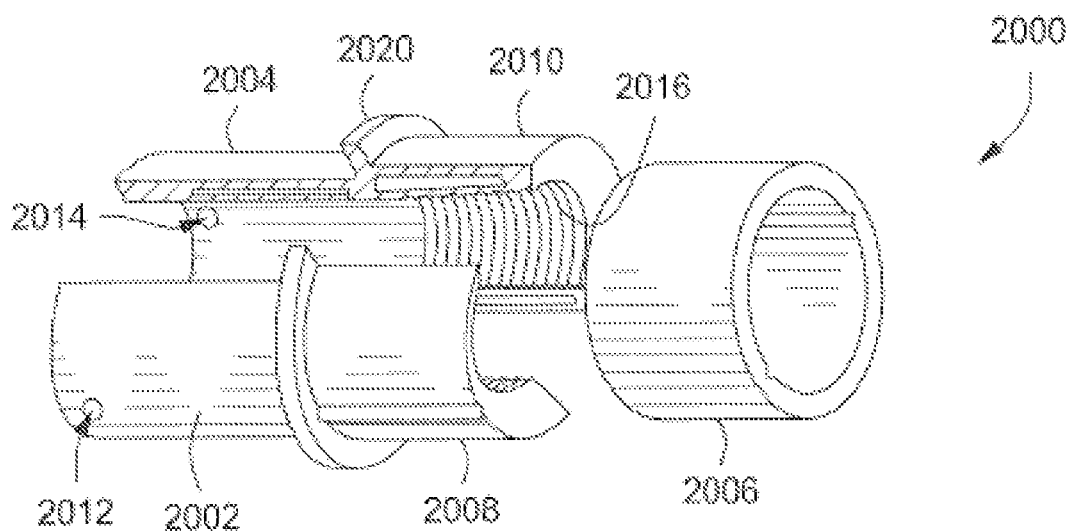
FIG. 20 depicts an isometric view of an illustrative connector receptor according to one or more embodiments described.

FIG. 20 depicts an isometric view of an illustrative connector receptor 2000 according to one or more embodiments. In one or more embodiments, the connector receptor 2000 can include receptor segments 2002, 2004 and a receptor retaining sleeve 2006. The receptor segments 2002, 2004, when connected or otherwise placed together can provide a hollow cylinder. The receptor retaining sleeve 2006 can hold the receptor segments 2002, 2004 together. Although not shown, the receptor segments 2002, 2004 and the receptor retaining sleeve can be formed from a single piece of material, i.e. integrated. In one or more embodiments, the receptor retaining sleeve 2006 can be disposed about at least a portion of the exterior surfaces of the receptor segments 2002, 2004. In one or more embodiments, the receptor retaining sleeve 2006 can be slidingly disposed over grooved ends 2008 and 2010 of the receptor segments 2002, 2004, respectively. In one or more embodiments, holes 2012 and 2014 can be disposed through the receptor segments 2002, 2004 at an end opposite the grooved ends 2008, 2010, respectively. In one or more embodiments, the holes 2012, 2014 can be linearly aligned when the receptor segments 2002, 2004 are connected or otherwise proximately placed together. In one or more embodiments, the aligned holes 2012, 2014 can receive a retaining pin 2125 (see FIG. 21) disposed therethrough.

In one or more embodiments, a plurality of grooves 2016 disposed on the interior surface of the grooved ends 2008, 2010. The plurality of grooves 2016 can receive a connector insert 2200 (see FIG. 22). The grooves can interlock with barbs disposed on the connector pin. In one or more embodiments, the plurality of grooves 2016 can be a plurality of barbs or other protrusions and the plurality of grooves can be disposed on the connector pin. The interlocking grooves/protrusions can prevent the removal of the connector pin from the connector receptor 2000. However, in one or more embodiments, a predetermined pulling force can separate the connector receptor 2000 from a connector pin interlocked therewith.

Figure 21:
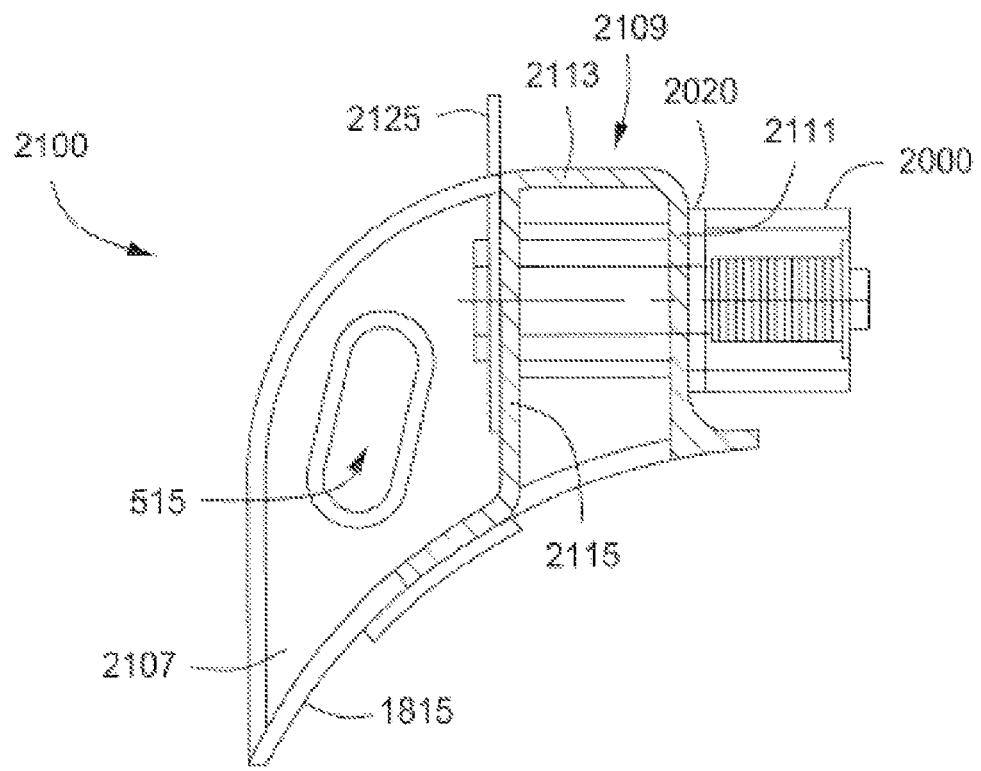
FIG. 21 depicts a cross-sectional view of an illustrative connector receiving lug according to one or more embodiments described.

FIG. 21 depicts a cross-section of an illustrative connector receiving lug 2100 according to one or more embodiments. The connector receiving lug 2100 can include a connector base 2107, which can include a base housing 2109. The base housing 2109 can include a first or side wall 2103 (see FIG. 24), a second or side wall 2105 (See FIG. 24), a third or front wall 2111, a fourth or top wall 2113 and a fifth or rear wall 2115. As used herein, the terms "top," "bottom," "upper," "lower," "side," "left," "right," "rear," "front," "rear," and other like terms refer to relative positions to one another and are not intended to denote a particular spatial orientation.

Also, as discussed and described above with reference to FIGS. 5 and 6, the two side walls 2103, 2105 can extend perpendicularly from the sidewall of the third section 1815 and can be disposed parallel to the second locking edge 1822, as shown in FIG. 18. In one or more embodiments, the side walls 2103, 2105 can be parallel and spaced apart from each other as depicted in FIGS. 4-6 above and FIG. 24 below. As discussed and described above with reference to FIGS. 4-6, one or more slots or apertures 515 can be disposed in either or both side walls 2103, 2105 to permit the detachable attachment of the one or more connector receiving lugs 2100 to one or more connectors 190.

Continuing with reference to FIG. 21, a front wall opening (not shown) can be disposed through the front wall 2111. A rear wall opening (not shown) can be disposed through the rear wall 2115. The front wall opening and the rear wall opening can be aligned to allow connector receptor 2000 segments 2002 and 2004 to extend therethrough and thus through base housing 2109. After installing the connector receptor 2000 into the connector base 2107 a retainer pin 2125 can be inserted through aligned holes 2012, 2014 disposed through the receptor segments 2002, 2004, respectively. A flange 2020 can extend outwardly from the connector receptor 2000. The flange 2020 can prevent the connector receptor 2000 from passing through the base housing 2109. The flange 2020 and the retainer pin 2125 can secure the connector receptor 2000 within the base housing 2109.

Figure 22:
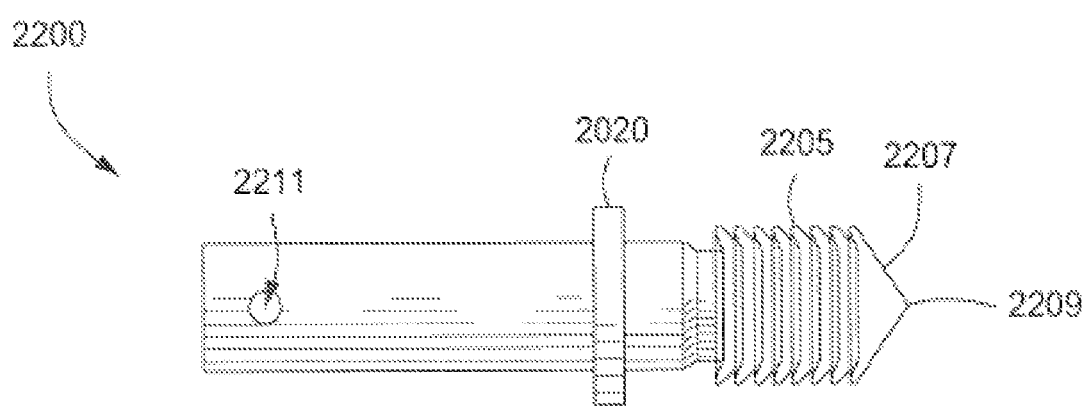
FIG. 22 depicts a side view of an illustrative connector insert according to one or more embodiments described.

FIG. 22 depicts a side view of an illustrative connector insert 2200 according to one or more embodiments. The connector insert 2200 can be an elongated cylindrical member. In one or more embodiments, the connector insert 2200 can include a plurality of barbs 2205 extending outwardly from an insert end 2207. In one or more embodiments, the plurality of barbs 2205 can be a plurality of grooves or other recesses and the plurality of barbs can be disposed on the connector receptor 2000. In one or more embodiments, the insert end 2207 can include a conical tip 2209, which can improve the introduction of the insert end 2207 into the connector receptor 2005 (see FIGS. 20 and 21). In one or more embodiments, the connector insert can include a hole 2211 disposed through the connector insert 2200 toward an end opposite the barbs 2205. In one or more embodiments, the connector insert 2000 can be a hollow cylindrical member. If the connector insert 2200 includes a hollow bore the connector insert can include two aligned holes 2211 disposed through the connector insert 2200 toward an end opposite the barbs 2205.

Figure 23:
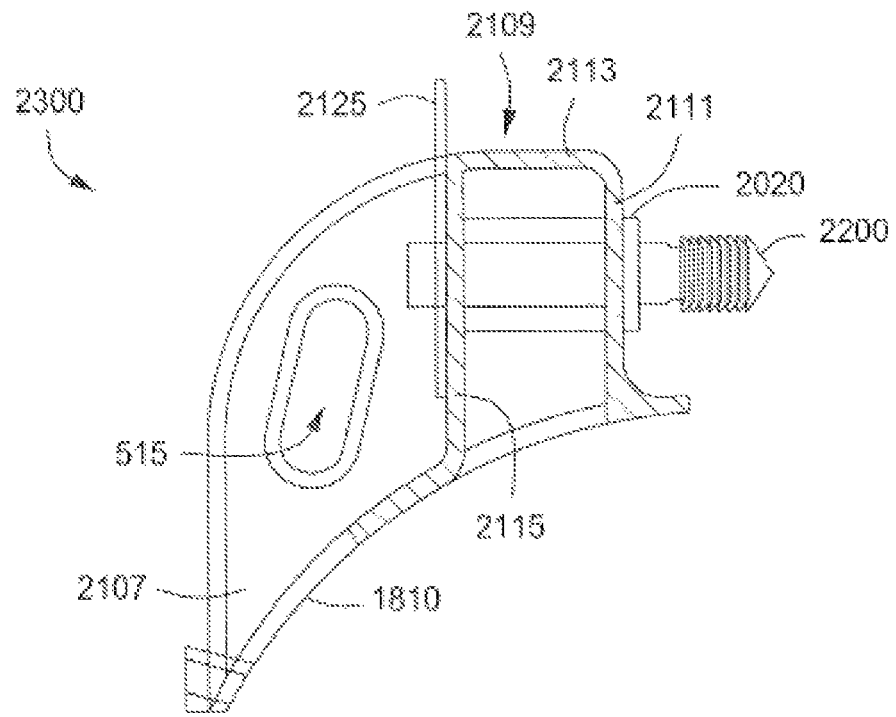
FIG. 23 depicts a side view of an illustrative connector insert lug according to one or more embodiments described.

FIG. 23 depicts a side view of an illustrative connector insert lug 2300 according to one or more embodiments. In one or more embodiments, the connector insert lug 2300 can include a connector base 2107, which can include a base housing 2109. The base housing 2109 can include a first or side wall 2003 (see FIG. 24), a second or side wall 2005, a third or front wall 2111, a fourth or top wall 2113 and a fifth or rear wall 2115, which can be similar as discussed and described above with reference to FIG. 21.

In one or more embodiments, a retainer pin 2125 can be disposed through the hole 2211 disposed through the connector insert 220 end. In one or more embodiments, the connector insert 2200 can include a flange 2020 which can prevent the connector receptor 2000 from passing through the base housing 2109. The flange 2020 and the retainer pin 2125 can secure the connector receptor 2000 within the base housing 2109.

Figure 24:
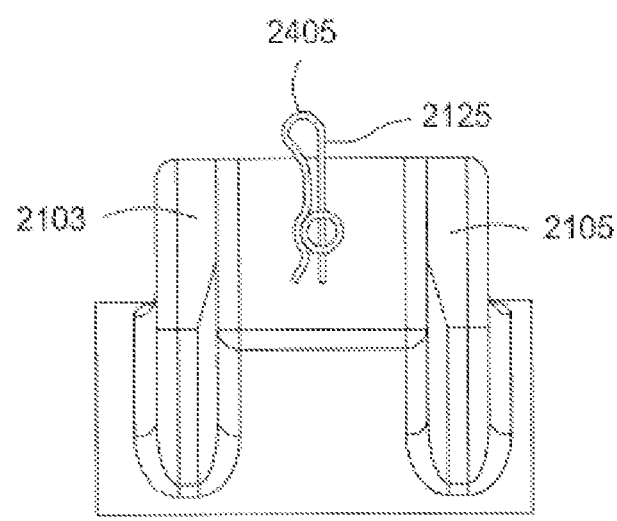
FIG. 24 depicts an end view of an illustrative connector receiving lug and a connector insert lug, according to one or more embodiments described.

FIG. 24 depicts an end view of an illustrative connector receiving lug 2100 and/or a connector insert lug 2300, according to one or more embodiments. In one or more embodiments, the retaining pin 2125 can include a loop 2405. The loop 2405 can provide an attachment or gripping point for a ROV or a diver (not shown) to grasp the retaining pin 2125 for removal. The retainer pin 2125 as shown depicts a cotter pin. However, the retainer pin 2125 can include any suitable retaining mechanism. Other suitable retaining mechanisms can include a screw, bolt and nut, rivet, welding, adhesives, cable ties, wire, rope, string, or any combination thereof.

In one or more embodiments, a diver, ROV, or any other suitable tool can remove the retaining pin 2125, which can release the strake 400, 1800 from the sub-sea structure (not shown). In one or more embodiments, the retaining pin 2125 can be metallic, non-metallic, or a combination thereof. In one or more embodiments, the retaining pin 2125 can be a copper, inconel 625, or any other metal that can resist biofouling. In one or more embodiments, the retaining pin can be coated with one or more anti-fouling agents.

In one or more embodiments, any component, part, or device described above including the entire tool 100, the body 105, support members 115, 130, connectors 190, 1500, or strake 400 can be at least partially made from a material, including, or having disposed thereon, one or more marine growth inhibitors ("antifouling agents"). Antifouling agents can be applied in any suitable form such as a solid or a liquid. The one or more antifouling agents can be applied as or included within a coating, such as a paint, paste, lacquer, laminate, wax, gel, glue, epoxy, or resin; a solid, such as a foil, bar, rod, particulate powder, or a wire. Illustrative solid antifouling agents can include copper, zinc, titanium, tin, tantalum, nickel, iron, alloys thereof, oxides thereof, and combinations thereof. Preferred alloys include copper/nickel and copper/beryllium alloys and other alloys known in the art to deter marine life growth. Illustrative, commercially available coatings or paints include, but are not limited to International Paint's INTERSLEEK 900, INTERSLEEK 700, MICRON 66, MICRON EXTRA, all available from International Paints; Trinidad, available from Pettit; ABC RELEASE 670 and 671, available from PPG; and/or Flag COPPERQUICK Antifouling, and Flag PERFORMANCE EXTRA Antifouling, available from Flag Paint and Finishes. An antifouling system known by the trade name CUPROTECT can also be used.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. An apparatus for installing an underwater device on sub-sea. structures, comprising:
   a body having at least two support arms extending away from a longitudinal axis of the body, wherein the support arms do not move independently of the body;
   an actuator disposed on each support arm, wherein the actuators are adapted to move independently of the body and adapted to move independently of the support arms in a linear direction; and
   a connector disposed on each actuator, wherein each connector includes at least one aperture disposed therethrough for connecting to the underwater device.

2. The apparatus of claim 1, wherein the actuator is adapted to move in a direction that is perpendicular to the support arms.

3. The apparatus of claim 1, wherein the actuator comprises a piston that is adapted to move independently of the body and adapted to move independently of the support arms in the linear direction.

4. The apparatus of claim 3, wherein the connector is disposed on the piston.

5. The apparatus of claim 1, further comprising an attachment member disposed through the at least one aperture for connecting to the underwater device.

6. The apparatus of claim 5, wherein the attachment member comprises a tie wrap, a wire, a string, a pin, or any combination thereof.

7. The apparatus of claim 5, wherein the attachment member breaks when exposed to a force less than about 3 kN.

8. The apparatus of claim 1, wherein the at least two support arms are perpendicular to the longitudinal axis of the body.

9. The apparatus of claim 1, wherein the actuators are generally coaxial to one another.

10. The apparatus of claim 9, wherein the linear direction is along an axis that is offset from the body.

11. The apparatus of claim 9, wherein the support arms are in direct contact with the body.

12. The apparatus of claim 1, wherein the linear direction of each actuator is along an axis that does not pass through the body, and wherein the actuators are generally coaxial to one another.

13. An apparatus for installing an underwater device on sub-sea structures, comprising:
   a body having first and second support arms extending away from a longitudinal axis of the body, wherein the support arms do not move independently of the body;
   a first actuator disposed on the first support arm, wherein the first actuator is adapted to move independently of the body and adapted to move independently of the first support arm in a linear direction;
   a second actuator disposed on the second support arm, wherein the second actuator is adapted to move independently of the body and adapted to move independent of the support arms in a linear direction, and wherein the first actuator and the second actuator move collinearly; and
   a connector disposed on the first actuator, wherein the connector includes at least one aperture disposed therethrough for connecting to the underwater device.

14. The apparatus of claim 13, wherein the first actuator comprises a piston that is adapted to move independently of the body and adapted to move independently of the support arms in a linear direction.

15. The apparatus of claim 14, wherein the connector is disposed on the piston.

16. The apparatus of claim 13, further comprising an attachment member disposed through the at least one aperture.

17. The apparatus of claim 16, wherein the attachment member breaks when exposed to a force less than about 3 kN.

18. The apparatus of claim 16, wherein the attachment member comprises a tie wrap, a wire, a string, a pin, or any combination thereof.

19. An apparatus for installing an underwater device on sub-sea structures, comprising:
   a body having first and second support arms extending away from a longitudinal axis of the body, wherein the support arms do not move independently of the body;
   first actuator disposed on the first support arm, wherein the first actuator is adapted to move independently of the body and adapted to move independently of the first support arm in a linear direction;
   a second actuator disposed on the second support arm, wherein the second actuator is adapted to move independently of the body and adapted to move independent of the support arms in a linear direction, and wherein the first actuator and the second actuator move collinearly; and a connector having a first end coupled to the first actuator and a second end comprising first and second extensions extending axially therefrom, wherein the first and second extensions each have an aperture defined therethrough.

20. The apparatus of claim 19, wherein the apertures defined through the first and second extensions are aligned.

21. The apparatus of claim 19, further comprising an attachment member disposed through the apertures defined through the first and second extensions.

22. The apparatus of claim 21, wherein the attachment member couples the connector to the underwater device.

23. The apparatus of claim 22, wherein the attachment member breaks when exposed to a force less than about 3 kN.

24. The apparatus of claim 21, wherein the attachment member comprises a tie wrap, a wire, a string, a pin, or any combination thereof.

\* \* \* \* \*